(12) United States Patent
Khan et al.

(10) Patent No.: US 10,657,064 B1
(45) Date of Patent: May 19, 2020

(54) EXTENDING USAGES OF CACHED DATA OBJECTS BEYOND CACHE EXPIRATION PERIODS

(71) Applicant: salesforce.com, inc., San Francisco, CA (US)

(72) Inventors: Sameer Khan, Austin, TX (US); Francis James Leahy, III, Mill Valley, CA (US)

(73) Assignee: salesforce.com. inc., San Francisco, CA (US)

( * ) Notice: Subject to any disclaimer, the term of this patent is extended or adjusted under 35 U.S.C. 154(b) by 0 days.

(21) Appl. No.: 16/264,433

(22) Filed: Jan. 31, 2019

(51) Int. Cl.
*G06F 12/0871* (2016.01)
*G06F 12/0808* (2016.01)
*G06F 12/0893* (2016.01)
*G06F 12/126* (2016.01)

(52) U.S. Cl.
CPC ...... *G06F 12/0893* (2013.01); *G06F 12/0808* (2013.01); *G06F 12/0871* (2013.01); *G06F 12/126* (2013.01)

(58) Field of Classification Search
CPC .................................. G06F 12/00–16
See application file for complete search history.

(56) References Cited

U.S. PATENT DOCUMENTS

| 5,117,350 | A | 5/1992 | Parrish et al. |
| 5,623,641 | A | 4/1997 | Kadoyashiki |
| 2003/0115420 | A1* | 6/2003 | Tsirigotis ............ G06F 16/9574 711/133 |
| 2007/0118712 | A1 | 5/2007 | Riel et al. |
| 2012/0017037 | A1 | 1/2012 | Riddle et al. |
| 2014/0095804 | A1* | 4/2014 | Lientz .................... H04L 67/06 711/144 |
| 2017/0199694 | A1 | 7/2017 | Khemani et al. |
| 2017/0277638 | A1* | 9/2017 | Busayarat ........... G06F 12/0891 |

OTHER PUBLICATIONS

U.S. Appl. No. 16/264,393, Notice of Allowance dated Feb. 6, 2020.
U.S. Appl. No. 16/264,408, Non-Final Office Action dated Mar. 6, 2020.

* cited by examiner

*Primary Examiner* — Nicholas J Simonetti
(74) *Attorney, Agent, or Firm* — Wong & Rees LLP; Zhichong Gu

(57) ABSTRACT

A request for retrieving a cached data object from a data object cache used to cached data objects retrieved from one or more primary data sources is received from a data object requester. Responsive to determining that the cached data object in the data object cache is expired, it is determined whether the cached data object in the data object cache is still within an extended time period. If the cached data object in the data object cache is still within an extended time period, it is determined whether the cached data object is free of a cache invalidity state change caused by a data change operation. If the cached data object is free of a cache invalidity state change, the cached data object is returned to the data object requester.

21 Claims, 17 Drawing Sheets

EXTENDING USAGES OF CACHED DATA OBJECTS BEYOND CACHE EXPIRATION PERIODS

CROSS-REFERENCE TO RELATED APPLICATIONS

This application is related to U.S. patent application Ser. No. 16/264,393 (Attorney Docket No. A4168US1; 80011-0044), titled "ASYNCHRONOUS CACHE BUILDING AND/OR REBUILDING," by Balaji Iyer and Sameer Khan, filed on equal day; U.S. patent application Ser. No. 16/264,408, (Attorney Docket No. A4168US2; 80011-0049), titled "COUNTER TRACKER SERVICE," by Sameer Khan and Sanjaya Lai, filed on equal day; U.S. patent application Ser. No. 16/264,455, (Attorney Docket No. A4168US4; 80011-0051), titled "INVALIDATING CACHED DATA OBJECTS IN WRITE-THROUGH OPERATIONS," by Sameer Khan and Sanjaya Lai, filed on equal day, the contents of all of which are incorporated herein by reference in their entireties.

TECHNICAL FIELD

The present invention relates generally to data caching, and in particular, to implementing and providing cache services in a multitenant computing system.

BACKGROUND

A large-scale cloud-based computer system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

Data volumes for many organizations can grow over time. Data objects accessed by users, customers and other data consumers may be cached outside a database system in which underlying data for the data objects is persisted or stored. To minimize direct database accesses, the data objects may be served directly out of cache in response to read requests. As there may be a large number of users, customers and other data consumers in an organization, numerous read and write requests may be made to cached data objects of the organization at any given time. If a data object that is being requested concurrently by many users, customers and other data consumers is missing or invalid in cache, multiple attempts to load the data object from the database system to the cache can occur simultaneously or near-simultaneously. This results in a stampede scenario in which a large amount of network, database and other infrastructure resources is wasted and a long wait time to access the data object in cache is experienced.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
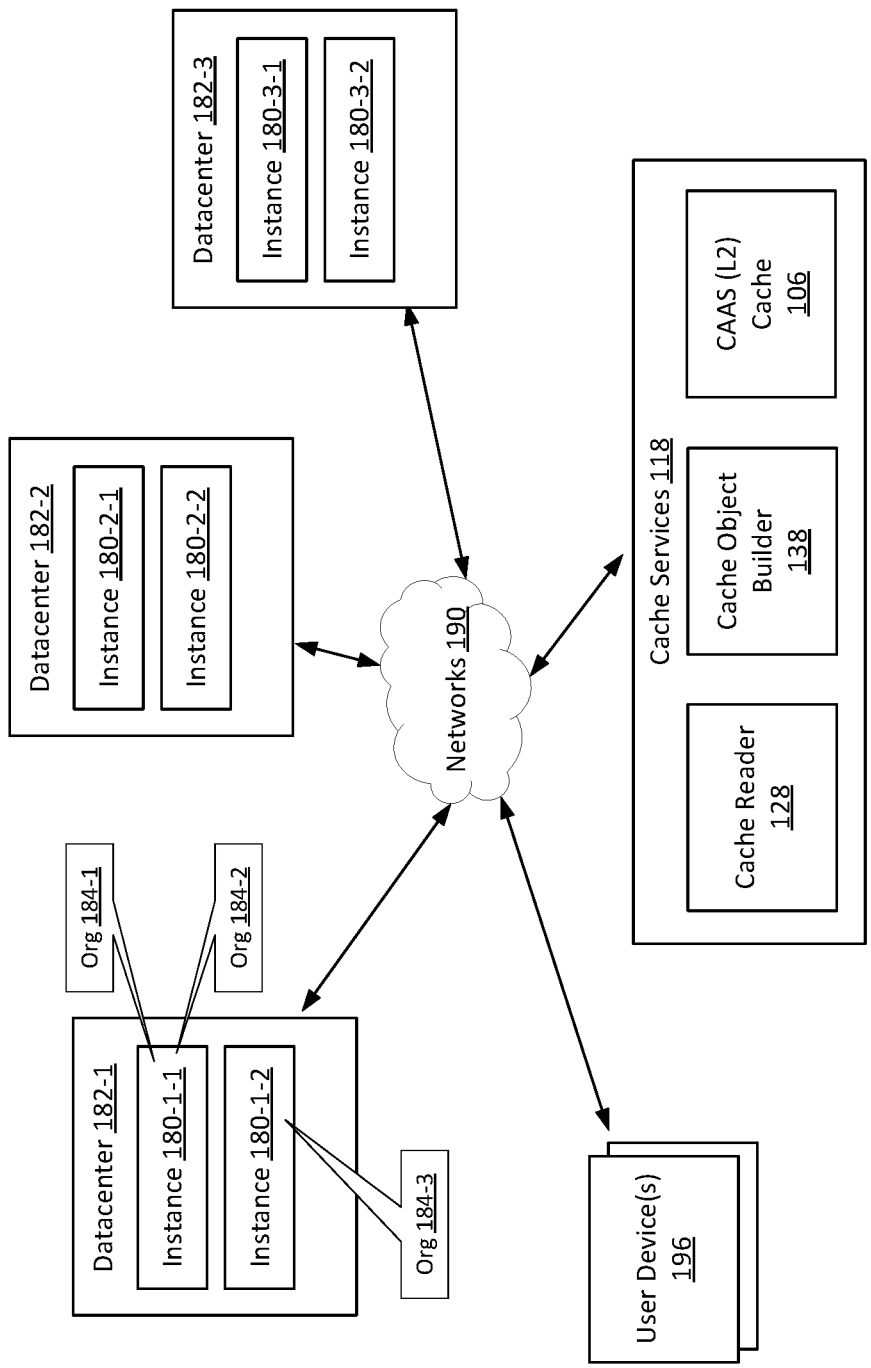
FIG. 1A illustrates an example overall cache service framework.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1 Cache Services
   2.2. Fetching Cached Data Objects
   2.3. BUILDING CACHED DATA OBJECTS SYNCHRONOUSLY
   2.4. BUILDING CACHED DATA OBJECTS ASYNCHRONOUSLY
   2.5. INVALIDATING CACHED DATA OBJECTS
   2.6. COUNTER TRACKER SERVICES
3.0. Example Embodiments
4.0 Implementation Mechanism—Hardware Overview
5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

A cache service platform as described can be used to implement and provide caching services capable of meeting a wide variety of needs across a wide array of use cases. The cache service platform offers caching solutions with a number of unique features and characteristics over other caching solutions such as distributed cache, direct Memcached cache, etc. The cache services may be implemented with intelligent, feature rich, highly scalable cache layers built on top of Redis based or non-Redis-based caching infrastructures or cache as a service (CaaS).

The cache services as described herein can be efficiently used to support high throughput read transactions (e.g., 10 million daily, 100 million daily, etc.) originated from a user interface (UI) tier, a mezzanine tier (e.g., in which application servers operate, etc.), a core tier (e.g., in which a global cache is maintained, etc.), etc., and provide significant backend scalability as related to network, database and other infrastructure resources of a multitenant computing system.

In some operational scenarios, caching services as described herein may be used to support high volume page views per unit time interval (e.g., 500-page views per minute, 1000-page views per minute, etc.) in a single community (e.g., living in an organization, a part of an organization hosted in the multitenant computing system, etc.) or organization against data objects whose underlying data are persisted or stored in one or more primary data sources such as Oracle or non-Oracle databases in a database system. The multitenant computing system may deploy many system components to support such a community or organization. Cache service consumers in some or all of these system components—including but not limited to those operating in the UI tier or the core tier—can access the caching services exposed through shared modules or services implemented with the cache service platform.

The cache services can serve the consumers or clients with up-to-date versions or values of data objects with no or little reliance on the primary data sources in the database system. Cache invalidation strategies may be implemented to track object state/data changes caused by write actions—or create, update and delete (CUD) operations in one or more write paths—performed on underlying data or data entities (including but not limited to standard entities, custom defined entities, database tables used to instantiate data entities at runtime, etc.) giving rise to cached data objects maintained in cache by the cache services.

The cache invalidation strategies implemented with the cache services can be entirely or substantially implemented outside the database system or the primary data sources. Thus, data objects may be invalidated without using database I/O resources such as SAN I/O resources of the database system or the primary data sources to verify whether underlying data for the data objects has been altered. As a result, the database system or the primary data sources are free from maintaining versioning data for cached data objects. A global cache such as CaaS can be directly used by the cache services to maintain versioning data for cached data objects in the cache.

Versioning data representing object state/data changes, as generated by the cache services in response to write actions or CUD operations and maintained outside the database system, can be used to determine and ensure that any cached version or value of a cached data object that is returned to a cache service consumer in response to a read request for the cached data object is up to date and consistent with or the same as a data object directly constructed from the up-to-date underlying data persisted/stored in the primary data sources in the database system.

In some operational scenarios, a large number of parallel application threads representing multiple cache service consumers from a single system instance of a multitenant computing system may concurrently attempt to consume the same cached data object and experience cache misses if the cached data object is missing or no longer valid.

Under some approaches that do not implement techniques as described herein, these application threads can fall back to the primary data sources in the database system, cause multiple concurrent accesses to underlying data in the primary data sources, and result in a cache stampede scenario in which the same data object is concurrently being reloaded multiple times during time periods of possibly heavy read request arrival rates.

Techniques as described herein can be used to prevent the parallel application threads from generating multiple parallel reads to the same underlying data or data entities in the primary data sources. Instead, the cache services can arbitrate among the parallel application threads with a distributed soft lock mechanism and allow only a single application thread, among the parallel application threads, in possession of a granted distributed soft lock to reload the cached data object.

An extended TTL strategy may be supported or implemented by the cache services to minimize waiting times of accessing cached data objects. This is especially useful when a large number of application threads representing multiple cache service consumers from a single system instance of the multitenant computing system concurrently attempt to access a cached data object whose time-to-live (TTL) time period has expired. The cache services may implement a grace period extending from the TTL time period. If the cached data object is still within the grace period (or an extended TTL time period), the cache services can use versioning data as collected with an object state/data change invalidation strategy to determine whether the cached data object is invalidated because of any write action or CUD operation performed on underlying data or data entities that gives rise to the cached data object. If the cached data object is determined to be not invalidated, then the cached data object can still be served by the cache services to the cache service consumers. Additionally, optionally or alternatively, the cached data object can be concurrently loaded, for example with a backend thread without holding up the application threads representing the cache service consumers in a (thread) wait state.

Multiple levels of caches may be implemented with the cache services to allow efficient access to cached data objects while at the same time minimizing overheads and over-consumptions of network, database and other infrastructure resources in a system instance or the database system therein. Level 1 (L1) caches may be implemented in a layer anywhere between the UI tier and the core tier inclusive in addition to a level 2 (L2) cache implemented in the core tier or outside of both the UI tier and the core tier. For example, L1 caches may reside within either UI tier or core tier, depending on where cache service is being consumed. If cache service is being consumed from within the UI tier, the L1 cache would also reside in the UI tier. If cache service is being consumed from within the core tier, the L1 cache would reside in the core tier. In some operational scenarios, L2 cache refers to Redis based cache service that lives as a separate process outside of UI tier and outside of the core tier. The L2 cache may be used as a global cache in a system instance and serves as a reference cache for all the L1 caches. That is, any data object cached in the L1 caches is invalid if the data object is out of sync with a counterpart data object in the L2 cache.

A L1 cache may be implemented in memory with an application server running in a virtual machine such as a Java virtual machine. By way of example but not limitation, the application server implementing the L1 cache in memory may be responsible for handling a subset of read requests from a subset of cache service consumers for a subset of data objects that are cached in the global cache or the L2 cache. To the subset of cache service consumers, the application server acts as a cache data server. To core cache service modules, the application server acts as a cache service consumer.

The L1 cache implemented by the application server may be used to cache or temporarily store some or all data objects in the subset of data object once these data objects are returned from the global cache or the L2 cache by way of the core cache service modules.

The cache services ensure that cached data objects in the L1 cache are completely synchronized to counterpart cached data objects—corresponding to the cached data objects in the L1 cache—in the L2 cache. For example, when a counterpart cached data object in the L2 cache corresponding to a cached data object in the L1 cache is invalidated, the cached data object in the L2 cache is also invalidated and prevented from being served out from the L1 cache. This synchronization between or among various levels of caches in the cache services guarantees consistent and correct versions or values of data objects of relatively large data sizes to be returned to cache service consumers at relatively high read request arrival rates.

The cache services can implement a variety of scalable cache invalidation and/or cache rebuild strategies to cater to various needs of a wide array of use cases. Example cache invalidation strategies (upon a write action) may include, but are not necessarily limited to only, one or more of: TTL only invalidation (with a TTL time period as a system/user configurable value), TTL plus state change based invalidation, and so forth.

An example cache build/rebuild strategy implemented for a cached data object in the cache services may be referred to as synchronous cache refresh (or SYNC refresh), which involves building the cache data object (upon a cache miss) in a single foreground (request) application thread representing a single cache service consumer of N cache service consumers with the rest of (N−1) foreground (request) application threads either waiting for SYNC refresh operations to finish or being returned with an existing/staled version/value of the cached data object. The existing/staled version/value of the cached data object has TTL expired (hence has become staled) but still within an extended TTL time period with the cached data object not invalidated by state changes.

Another example cache build/rebuild strategy implemented for a cached data object in the cache services may be referred to as asynchronous cache refresh (or ASYNC refresh), which ASYNC refresh involves building the cached data object in a background/backend thread (via message queuing (MQ) in the core tier) with all N request application threads either being returned NULL or an existing/staled version/value of the cached data object. The existing/staled version/value of the cached data object has TTL expired (hence has become staled) but still within an extended TTL time period with the cached data object not invalidated by state changes.

In any of these above described ASYNC operational scenarios, a single foreground thread enqueues a cache refresh request in the core tier via MQ. The background/backend thread can then dequeue the cache refresh request and perform building or rebuilding the cached data object in background without holding any foreground (request) thread in a wait state.

Some or all of the cache services may implement a set of cache service methods or API calls. The set of cache service methods or API calls do not have to have hard affinity or hard dependence on either the UI tier or the core tier, and can be exposed to cache service consumers from a shared or mezzanine tier between the UI tier and the core tier.

Additionally, optionally or alternatively, counter tracker services may be implemented in the cache services to allow counter tracker service consumers to track and maintain counters in cache such as in a global cache. In some operational scenarios, these counters exist only in the global cache without being stored/persisted in the primary data sources in the database system. Building/rebuilding of a cache-only counter for the counter may be performed in read accesses/operations only (e.g., not for write accesses/operations, etc.). This allows write actions that update counter values to be relatively light-weight operations without having to perform any expensive building/rebuilding of the cache-only data object. Counter tracker services may be used in example use cases in which a count is a) expensive to compute-and-retrieve from the primary data sources; b) transient in nature and hence not maintained by a persistent storage; c) an input to either a computed metric or acting as a trigger for an action such as rewarding users with badges upon exceeding certain thresholds of logins per unit time; etc.

In an example, counter tracker services may be used in example use cases falling under the "expensive to compute-and-retrieve" category. Counters in this category may be used to maintain user counts against a large population of existing or potential users for the purpose of enforcing a license number limit. These counters may be useful in operational scenarios in which a large population of portal users in the range of tens of millions are supported and count queries become progressively expensive as the population of portal users continually increases or scales.

In another example, counter tracker services may be used to maintain a record count for a given data entity or data object of an organization such as a record count of a data entity "Account Relationship." The record count, or a corresponding counter that maintains the record count, can be used to enforce a high-water mark cap or limit to prevent organization-specific data of the organization from becoming too large. An existing count is accessed from the counter and compared with the high-water mark cap or limit anytime a record (or a set of records via bulk inserts) is provisioned in the organization.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1A illustrates example cache services 118 in a computing system. Example computing systems that implement the cache services (118) or the layered abstraction structure as described herein may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 190.

In some embodiments, the computing system hosts a plurality of organizations and comprises a plurality of datacenters such as 182-1, 182-2, 182-3, etc., as illustrated in FIG. 1A, which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multitenant computing system to host their respective (e.g., organization-specific, organization-common, etc.) application data, to provide their (e.g., organization-specific, organization-common, etc.) application services to their respective users and/or customers. Examples of application data may include, but are not limited to, organization-specific application data, organization-common application data, application configuration data, application data, application metadata, application code, etc., specifically generated or configured for (e.g., organization-specific, organization-common, etc.) application services of an individual organization, etc.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1A, each datacenter (e.g., 182-1, 182-2, 182-3, etc.) may comprise a set of one or more system instances. A first datacenter 182-1 comprises first system instances 180-1-1, 180-1-2, etc.; a second datacenter 182-2 comprises second system instances 180-2-1, 180-2-2, etc.; a third datacenter 182-3 comprises third system instances 180-3-1, 180-3-2, etc.

Each system instance (e.g., 180-1-1, 180-1-2, 180-2-1, 180-2-2, 180-3-1, 180-3-2, etc.) in the hosting computing system can host up to a maximum number of organizations such as 5,000 organizations, 10,000 organizations, 15,000+ organizations, etc. As illustrated in FIG. 1A, the system instance (180-1-1) in the datacenter (182-1) may host a first organization 184-1 and a second organization 184-2, among others; the system instance (180-1-1) in the datacenter (182-1) may host a third organization 184-3, among others.

In some operational scenarios, read and write requests for a set of data objects of an organization may be originated by operations performed with one or more user devices 196, with one or more application servers (not shown) in a system instance hosing the organization, with one or more other servers in the system instance, and so forth. A data object as described herein may comprise cacheable data derived or generated from underlying data (or data entities) persisted in one or more primary data sources (e.g., one of which may be 108 of FIG. 1D, etc.) operated or managed by a database system located in a system instance in the computing system.

To minimize overheads and over-consumptions of network, database and other infrastructure resources, the set of data objects or cacheable data thereof may be cached in a global cache such as a CaaS (L2) cache 106 and/or one or more L1 caches maintained by application servers or virtual machines in which the application servers are running.

Read requests for a data object in the set of data objects from cache service consumers from UI or other tiers may be processed by a cache reader 128 and satisfied from cacheable or cached data of the data object in cache.

In response to determining that the cached data of the data object is invalidated, a cache object builder 138 in the cache services may be invoked to build or rebuild the data object in cache synchronously or asynchronously.

2.1 Cache Services

Figure 1B:
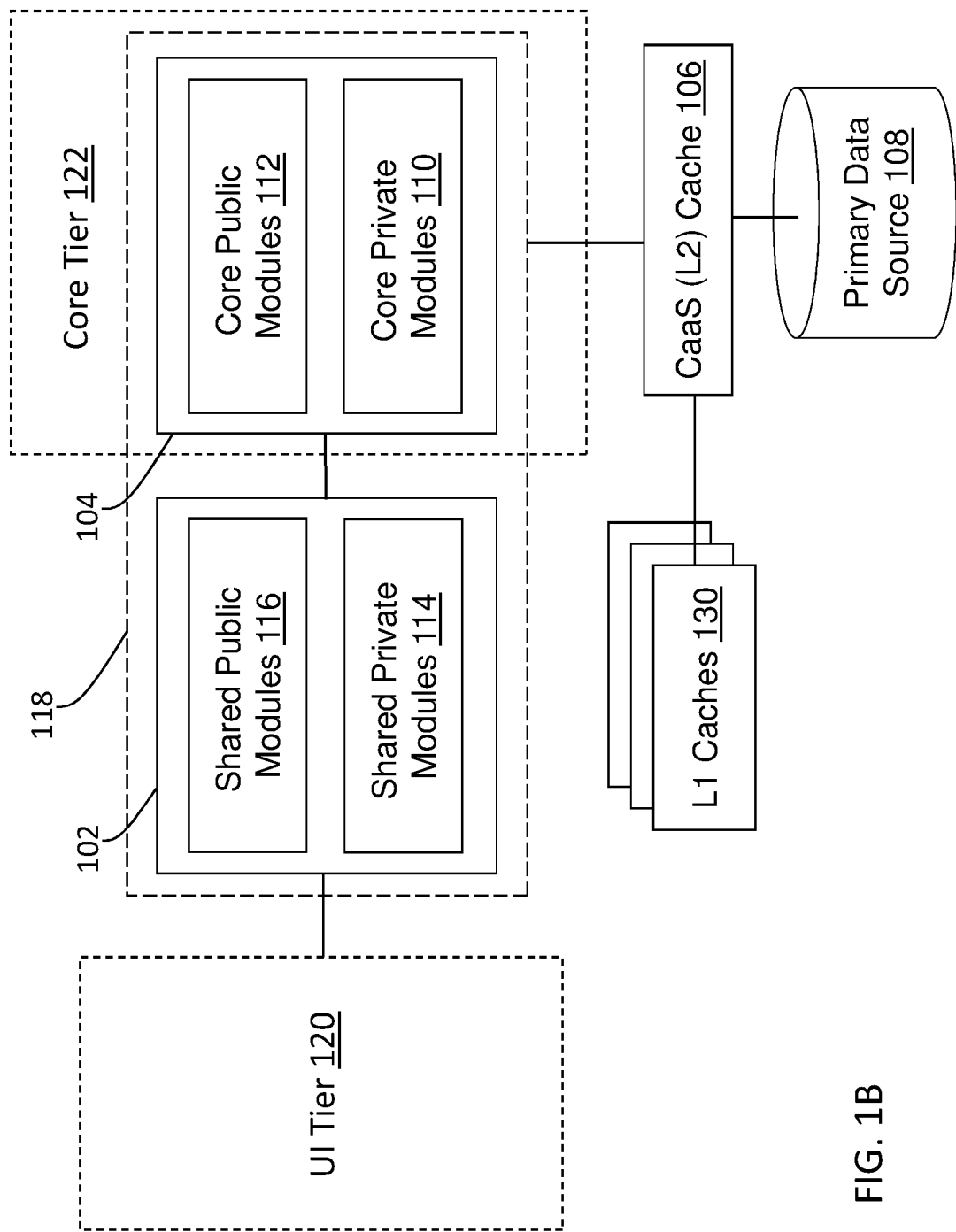
FIG. 1B illustrates an example layered abstraction structure for cache services.

FIG. 1B illustrates an example layered abstraction structure for cache services 118. Example computing systems that implement the cache services (118) or the layered abstraction structure as described herein may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks (e.g., 190 of FIG. 1A, etc.).

As illustrated in FIG. 1B, the cache services (118) can be offered through a shared cache service layer 102 and a core cache service layer 104 built on top of a CaaS 106 that caches data objects. The data objects cached by and retrieved through the cached services (118) or the shared and/or core layers therein may, but are not limited to, be persisted in and retrieved from a primary data source 108 such as an Oracle database, a non-Oracle database, etc.

The core cache service layer (104) may be implemented or deployed in a core tier 122. In some embodiments, the core cache service layer (104) comprises core private modules 110, core public modules 112 corresponding to the core private modules (110), etc. The core private modules (110) in the core cache service layer (104) contain specific implementations for (e.g., class, object, etc.) interfaces and services of the core cache service layer (104). The interfaces and services as implemented by the core private modules (110) may be exposed by the core public modules (112) in the core cache service layer (104). In some operational scenarios, some or all of the core private modules (110) are not to be imported by any (e.g., other, etc.) modules.

The core public modules (112) contain attendant cache services for invalidating cached data objects (or cache invalidations), building cached data objects via asynchronous refresh, building cached data objects via synchronous refresh, and so forth. Additionally, optionally or alternatively, the core public modules (112) contain internal utilities, services, etc., specific to or implemented by the core cache service layer (104). A core public module in the core public modules (112) may be imported by a core cache service consumer module using components/modules available in the core cache service layer (104).

The shared cache service layer (102) may be implemented or deployed (e.g., in an application server layer in which application threads reside, in a UI renderer layer, etc.) between a UI tier 120 and the core tier (122). In some embodiments, the shared cache service layer (102) comprises shared private modules 114, shared public modules 116 corresponding to the shared private modules (114), and so forth. The shared private modules (114) in the shared cache service layer (102) contain specific implementations for (e.g., class, object, etc.) interfaces and services of the shared cache service layer (102). The interfaces and services as implemented by the shared private modules (114) may be exposed by the corresponding shared public modules (116) in the same shared cache service layer (102). In some operational scenarios, some or all of the shared private modules (114) are not to be imported by any (e.g., other, etc.) modules. A shared public module in the shared public modules (116) can be imported in a shared cache service consumer module or a core cache service consumer module.

The shared public modules (116) contain (specific implementations for) application programming interfaces (APIs) and services for consuming cache services, value provider interfaces, cache service related abstract classes, cache key builders, object version key builders, and so forth. Additionally, optionally or alternatively, the shared public modules (116) contain internal utilities, services, etc., specific to or implemented in the shared cache service layer (102).

Cache service consumers may be allowed to (e.g., only, etc.) import public modules such as the core public modules (112) and/or the shared public modules (116).

In some operational scenarios, the CaaS (106) may represent a global cache or an L2 cache. Some of all of the cached data objects may only be cached in the global cache as represented by the CaaS (106). Additionally, optionally or alternatively, some or all of the data objects cached in the global cache (or the L2 cache) may be cached in one or more L1 caches (e.g., in-memory caches, local caches, etc.) in application servers or virtual machines (e.g., java virtual machines or JVMs, etc.) in which the application servers are running.

For data objects cached in both the L1 and L2 caches, application servers or application threads operating with or managing the L1 caches may interact with one or more cache service consumers and invoke the cache services (118) (e.g., methods/interfaces/services implemented in the shared and/or core layers (102 and/or 104), etc.) to provide cached version of the data objects from the L1 caches instead of from the L2 cache (or the CaaS (106)).

As used herein, caching a data object refers to temporarily storing a cached version of the data object in one or more caches such as L1 and/or L2 caches, outside a (e.g., any, etc.) primary data source (e.g., 108, an Oracle database, a non-Oracle database, a database, a database system, etc.) used to persist or store underlying data (or data entities) for deriving the data objects. In some operational scenarios such as those related to counter tracker services, a cached version of a data object may refer to a cache-only value of the data object for which no underlying data (or data entities) is persisted or stored in the primary data source (108).

Under techniques as described herein, some or all shared modules (e.g., the shared private modules (114) and/or the shared public modules (116), etc.) in the shared cache service layer (102) can be used to make some or all of the cache services (118) available in the UI tier (120) and/or the core tier (122). Example cache services (e.g., 118, etc.) may include, but are not necessarily limited to only: any of: caching data objects in the L1 and/or L2 caches, invalidating cached data objects, synchronously building cached data objects, asynchronously building cached data objects, tracking counters by way of cached data objects in (e.g., L2, etc.) caches, and so forth.

Cache invalidation strategies used to invalidate cached data objects may be based on state changes. A state change based cache invalidation strategy can be leveraged or invoked by, or accessible from, either or both of the UI tier (120) and the core tier (122). In some operational scenarios, an invalidation of a cached data object can only happen or occur from within the core cache service layer (104) in the core tier (122). In these operational scenarios, a cache service consumer can still leverage or invoke, from within the UI tier (120) by way of the cache services (118), cached data object invalidation operations associated with or implementing a state change based cache invalidation strategy to cause a cached data object in the global cache and/or L1 caches to be invalidated. However, the invalidation of the cached data object (e.g., in the CaaS (106), in both L1 and L2 caches, on a write path, etc.) may only happen or occur within the core cache service layer (104) in the core tier (122).

One or more cached data object invalidation mechanisms may be employed or adopted under techniques as described herein to invalidate cached data objects (e.g., in the core tier (122), etc.). Example cached data object invalidation mechanisms may include, but are not necessarily limited to only, any of: via transaction observer(s), via cache invalidation APIs, implemented in the core cache service layer (104), etc.

Synchronous and/or asynchronous cache refresh services can be leveraged or invoked by, or accessible from, the UI tier (120), the core tier (122), etc. In some operational scenarios, loading of data objects into cache such as the global cache in connection with asynchronous refresh can only happen or occur from within the core cache service layer (104) in the core tier (122). In these operational scenarios, a cache service consumer can still leverage or invoke asynchronous cache refresh services from within the UI tier (120) or another tier at which a cache service consumer is deployed. However, building or loading a cached data object (e.g., in the CaaS (106), in both L1 and L2 caches, via MQ services, etc.) may only happen or occur within the core cache service layer (104) in the core tier (122). Asynchronous cache refresh requests (from requesting tier(s)) can be enqueued in a MQ 144 via representational state transfer (REST) API calls and dequeued/serviced by asynchronous cache message handlers.

2.2. Fetching Cached Data Objects

Figure 1C:
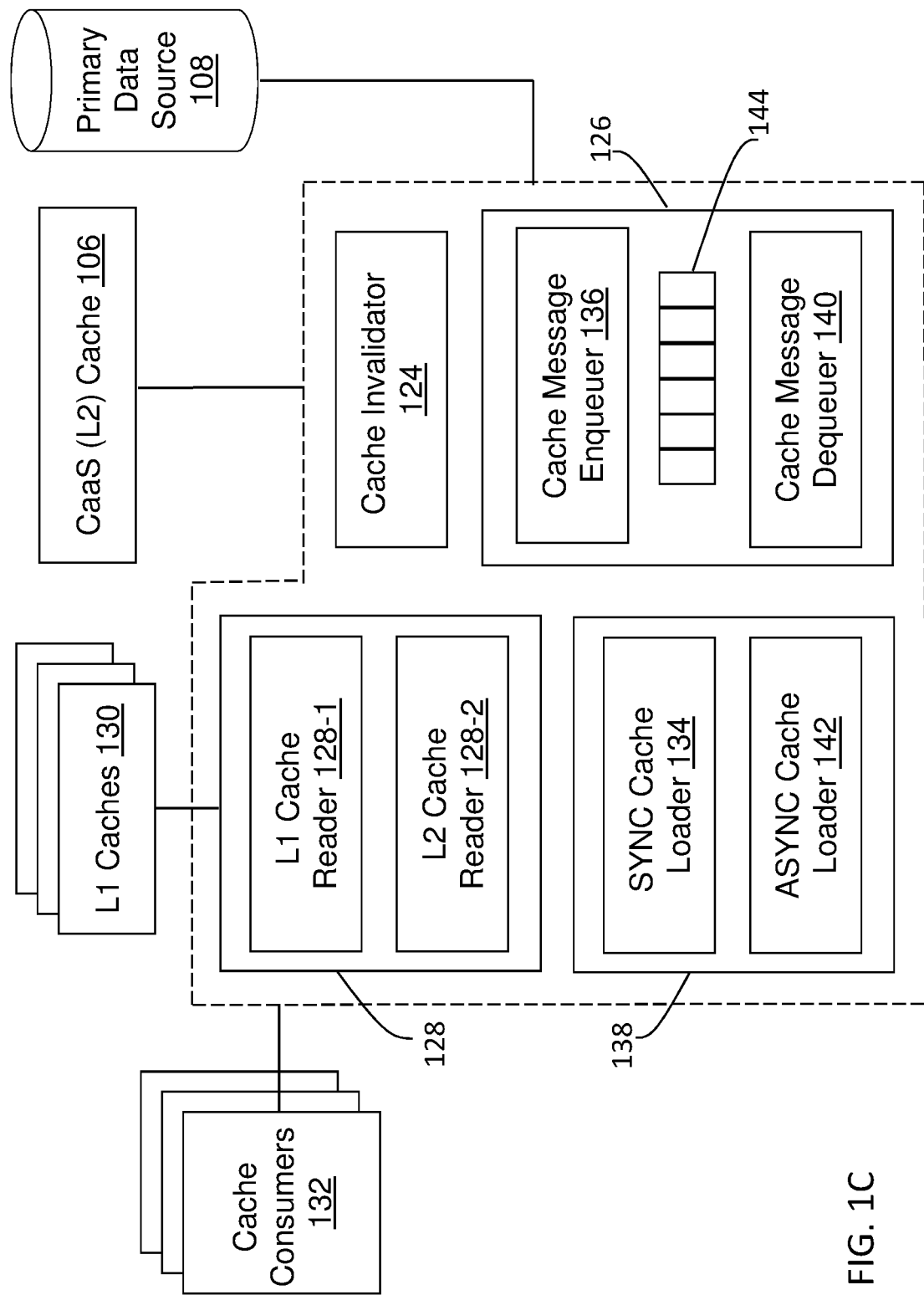
FIG. 1C illustrates example components of cache services.
Figure 2A:
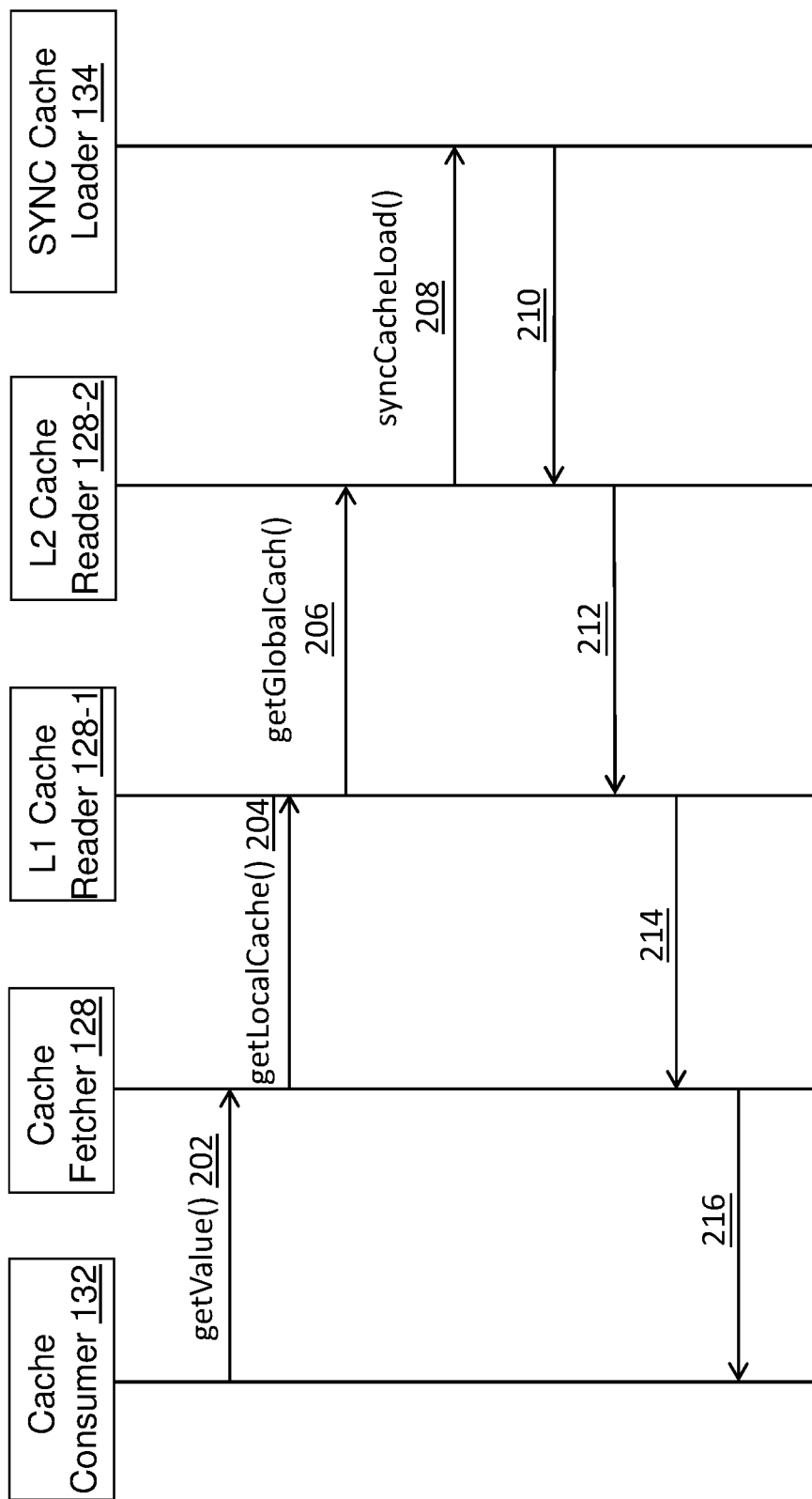
FIG. 2A through FIG. 2D illustrate example use cases or process flows for cache services.
Figure 2B:
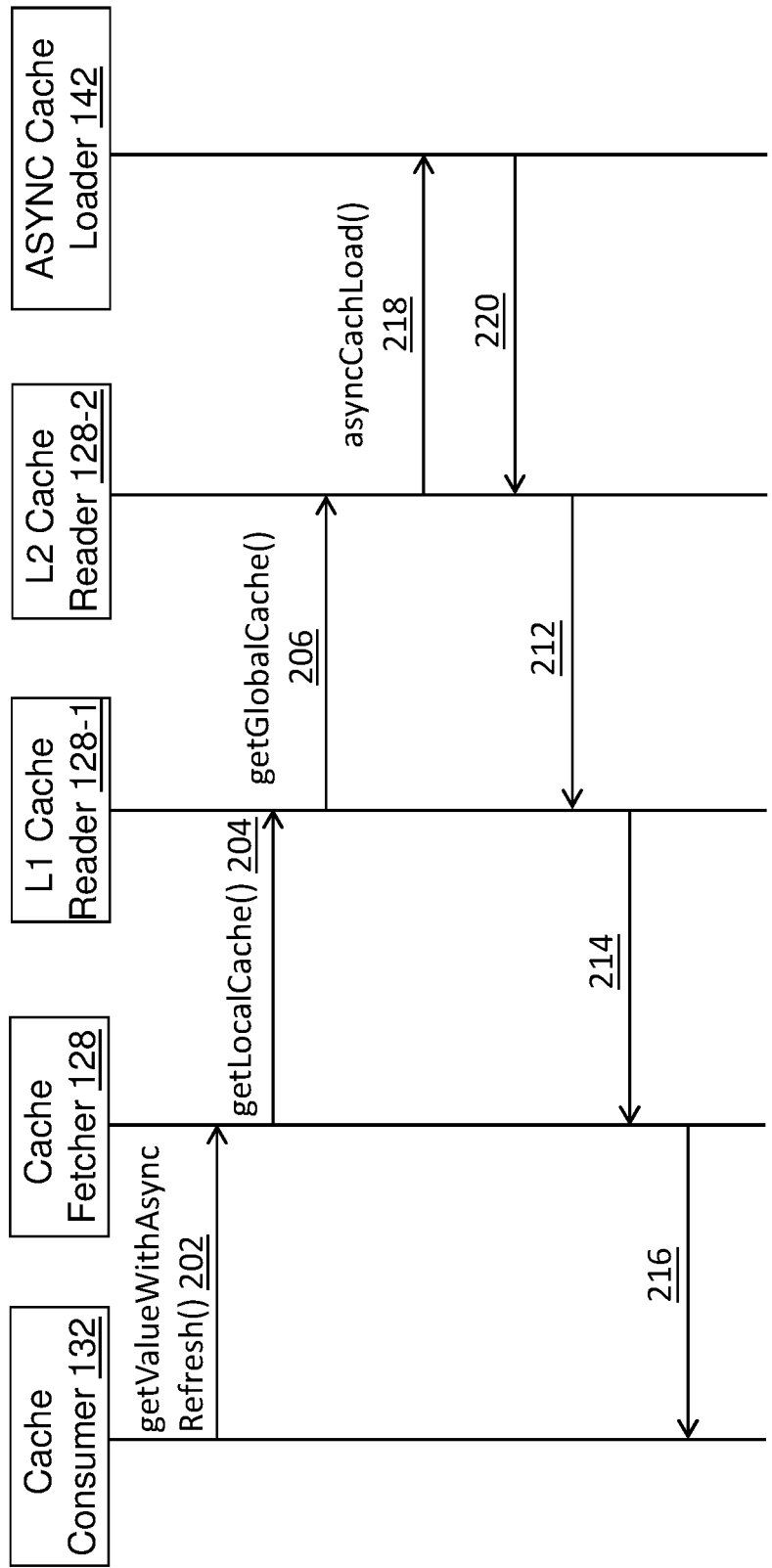
Figure 2C:
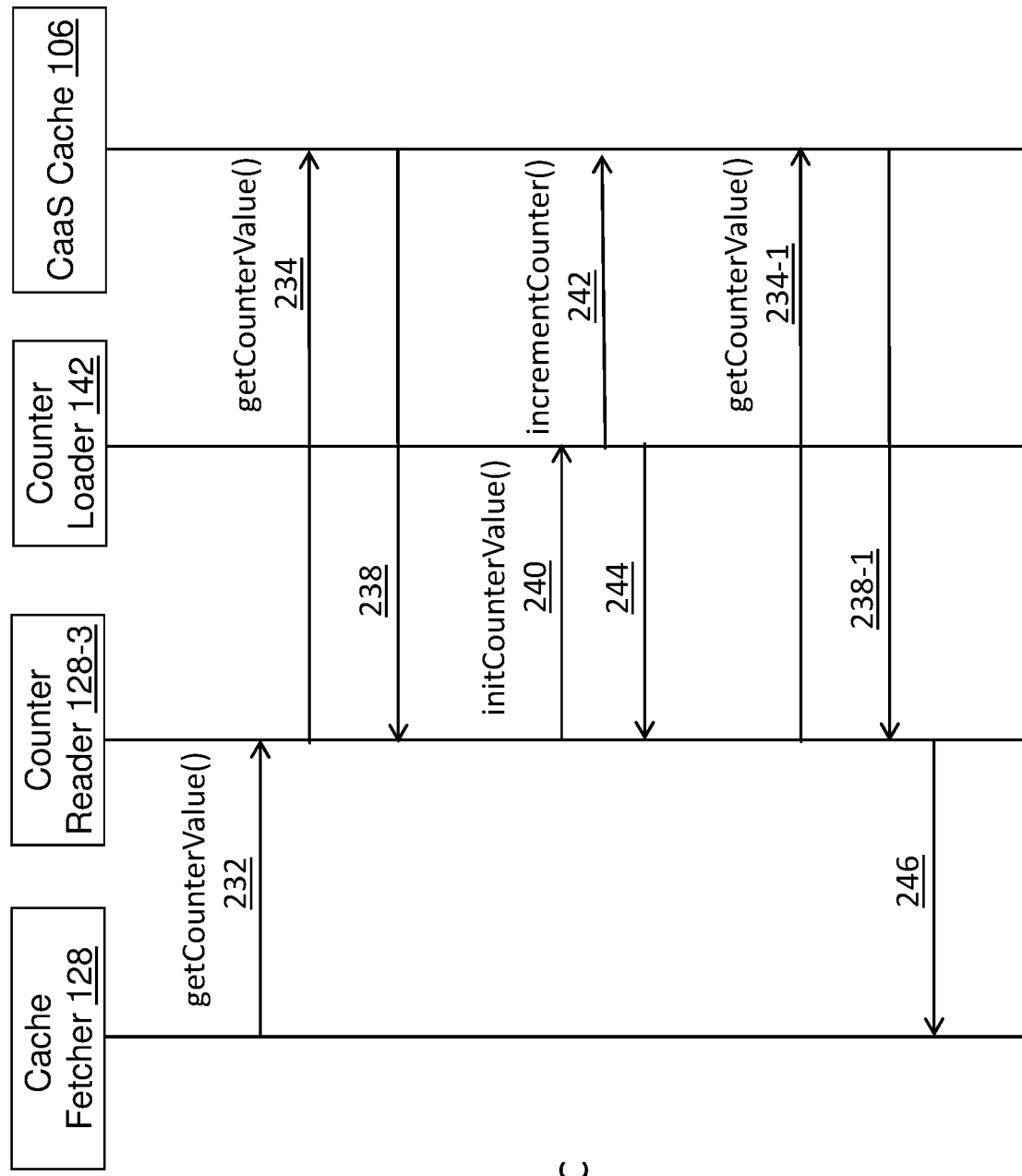
Figure 2D:
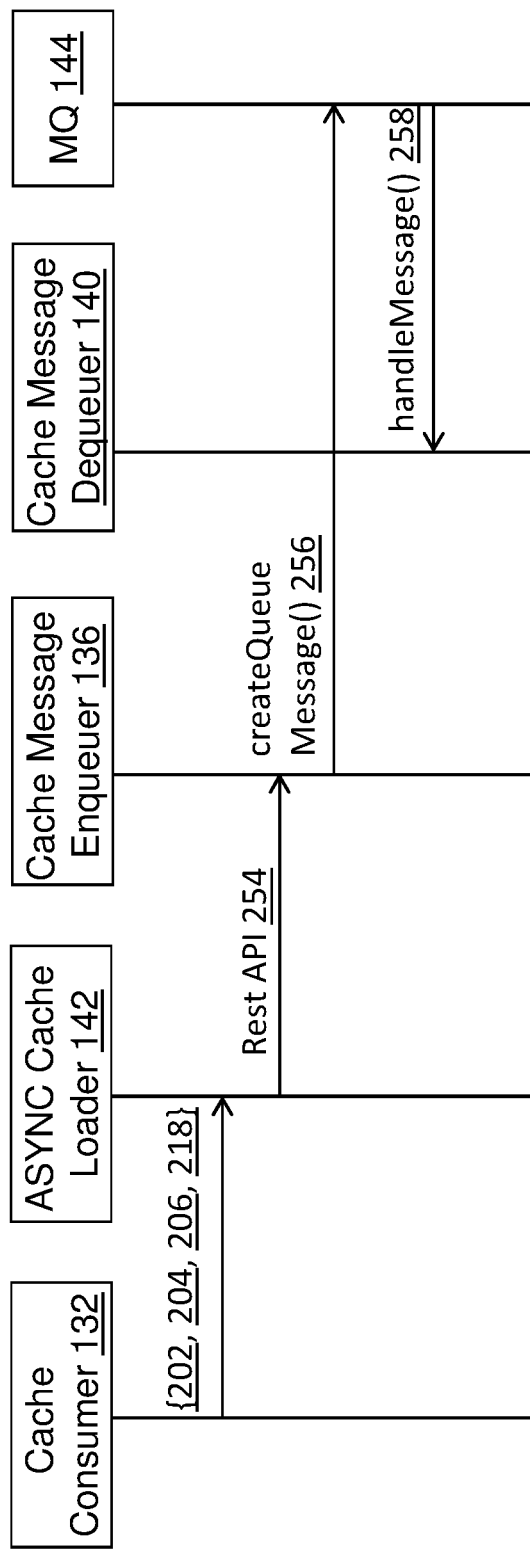

FIG. 1C illustrates example components of cache services (e.g., 118, etc.) for carrying out cache service process flows including but not limited to example process flows as illustrated in FIG. 2A, FIG. 2B, FIG. 2D, etc. Example computing systems that implement any, some and/or all of the components may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks.

Additionally, optionally or alternatively, the process flows of FIG. 2A, FIG. 2B, FIG. 2D, etc., may be implemented and/or performed using one or more computer programs, other software elements, and/or digital logic in any of a general-purpose computer or a special-purpose computer, while performing data retrieval, transformation, and storage operations that involve interacting with and transforming the physical state of memory of the computer. The process flows of FIG. 2A, FIG. 2B, FIG. 2D, etc., illustrate but some example process flows for carrying out cache services. Other process flows may involve additional or fewer steps, in potentially varying arrangements.

In step 202 (denoted as "getValue( )" of FIG. 2A or "getValueWithAsyncRefresh( )" of FIG. 2B, which may be implemented as a cache service method or API call to be invoked by application threads attempting to access a data object in cache) of FIG. 2A or FIG. 2B, one or more cache (service) consumers 132 may attempt to access a cached data object (or a cached version or value of a data object) through the cache services (118). The cached data object may be denoted as (k1, v1) in the cache services (118), where k1 denotes a cache key for the data object and v1 denotes the cached version (or cached data object value) for the data object. Each of the cache service consumers (132) may represent an application thread running in a cache service requesting tier such as a UI tier (e.g., 120 of FIG. 1B, etc.) or a non-UI tier.

The cache key (k1) may be generated by the cache services (118) with a corresponding cache key builder configured or implemented for the data object. The corresponding cache key builder can be invoked with cache key related input parameter/argument values passed in from the "getValue( )" or "getValueWithAsyncRefresh( )" method or API call. The "getValue( )" or "getValueWithAsyncRefresh( )" method or API call itself may be invoked (e.g., by a UI rendering component, class, or class object, etc.) with a set of input arguments. Some or all of the cache key related input parameter/argument values to the cache key builder may be derived from the set of input arguments to the "getValue( )" or "getValueWithAsyncRefresh( )" method or API call. Additionally, optionally or alternatively, some or all of the cache key related input parameter/argument values to the cache key builder may be provided or derived from environmental settings, context variables, etc., as maintained for the organization in the cached services (118) or by the system instance hosting the organization.

The cache key related input parameter/argument values to the cache key builder may include, but are not necessarily limited to only, one or more of: an organization identifier identifying a hosted organization to which the cache services (118) are being provided, a network identifier identifying a network among one or more networks (e.g., communities, a sub-division of the organization, etc.) of the organizations, a target type class name representing a class name of a cache object wrapper used to encapsulate cacheable data, a static maker used to distinguish the cache services (118) from other services or service types of a multitenant computing system hosting a plurality of organizations including the organization, a computed hash value computed over raw cache key content, and so forth.

Example (cached) data objects may include, but are not necessarily limited to only, any of: a cache-only data object, a cached copy of a persisted/stored data object of a primary data source, a cached copy of an organization-specific entity/object, a data object instantiated or derived at runtime from data field values stored/persisted in underlying physical database tables of a primary data source, a cached copy of one or more rows with column values of a set of one or more database table columns, a set of one or more data fields, a class or class object built with underlying persisted/stored data (or data entities) in a single primary data source or multiple primary data sources, and so forth.

The cached version of the data object that is served out to the cache service consumer from cache may be an up-to-date value of the data object as presently stored in the L1 and/or L2 caches. In some operational scenarios, the (e.g., reference, original, etc.) up-to-date value of the data object is persisted in and/or retrieved from the primary data source (108). In some operational scenarios, the (e.g., reference, original, etc.) up-to-date value of the data object is a cache-only value of the data object whose value is not persisted/stored in a (e.g., any, etc.) primary data source.

By way of illustration but not limitation, multiple cache service consumers (e.g., 132, etc.)—e.g., N concurrent application threads, where N is a positive integer greater than one (1)—attempt to fetch the cached version of the data object in parallel through the cache services (118). Each of the cache service consumers (132) can send or invoke a respective read request (or get request) for the data object. Read requests of the data objects may be directed to and received by the cache services (118) or a cache fetcher 128 therein.

In step 204 (denoted as "getLocalCache( )", which may be implemented as a cache service method or API call caused to be invoked by the method or API call "getValue( )" or "getValueWithAsyncRefresh( )" in step 202) of FIG. 2A or FIG. 2B, in response to (e.g., directly, indirectly, etc.) receiving the read requests for the data object from the cache service consumers (132), the cache fetcher (128) or a L1 cache reader (128-1) therein determines or builds the cache key (k1) with the corresponding cache key builder for the data object and uses the cache key (k1) to determine whether the data object is cached in L1 caches 130. A L1 cache as described herein may be implemented in a virtual machine in which one or more processing threads (e.g., application threads, processing threads for generating UI rendering components, etc.) constituting an application server are running. The size of the L1 cache available in the virtual machine or the application server may be limited, as compared with the size of the global cache or the L2 cache.

In a non-limiting implementation example, a L1 cacheable data object whitelist may be configured (e.g., by the organization, by an authorized user, etc.) for the cache services (118) to identify or specify (e.g., all, etc.) data objects that are permitted to be cached in the L1 caches (130) in addition to being cached in a global cache such as a CaaS (L2) cache 106.

The L1 cacheable data object whitelist specifies data objects cacheable in L1 caches in virtual machines or application servers. Hence, the L1 cacheable data object whitelist can be used to place an upper bound to constrain L1 cache memory usage in the virtual machines and the application servers, depending on how many, and what respective types/complexities of, data objects are permitted to be cached in the L1 caches by the L1 cacheable data object whitelist.

In response to determining that the data object is cacheable in the L1 caches (130), the L1 cache reader (128-1) attempts to fetch the cached version of the data object from the L1 caches (130). In steps 214 and 216 (which may successively return results from the methods or API calls getLocalCache( ) and getValue( ) getValueWithAsyncRefresh( ) of FIG. 2A or FIG. 2B, in response to successfully fetching the cached version of the data object from the L1 caches (130) (or a L1 cache hit), the cache fetcher (128) (e.g., directly, indirectly, etc.) returns the cached version of the data object as fetched from the L1 caches (130) to the cache service consumers (132).

On the other hand, in response to unsuccessfully fetching any cached version of the data object from the L1 caches (130) (or a L1 cache miss), in step 206 (denoted as "getGlobalCache( )", which may be implemented as a cache service method or API call to be invoked by "getLocalCache( )" in step 204) of FIG. 2A or FIG. 2B, the cache fetcher (128), or a L2 cache reader (128-2) therein, attempts to fetch the cached version of the data object from the CaaS (L2) cache (106). For example, the cached version of the data object may not exist in an L1 cache of a virtual machine in which an application thread of an application server is processing the read request for the data object. Once successfully read by the application thread, the cached version of the data object may be added to the L1 cache so that subsequent read requests handled by the application server or the virtual machine may be satisfied or met from the L1 cache if a set of conditions (e.g., within a time-to-live or TTL period, within an extended TTL period if the cached data object has not been invalidated, etc.) is met.

In steps 212 through 216 (which may successively return results from the methods or API calls getGlobalCache( ), getLocalCache( ) and getValue( )/getValueWithAsyncRefresh( )) of FIG. 2A or FIG. 2B, in response to successfully fetching the cached version of the data object from the CaaS (L2) cache (106) (or a L2 cache hit), the cache fetcher (128) (e.g., directly, indirectly, etc.) returns the cached version of the data object as fetched from the CaaS (L2 cache (106) to the cache service consumers (132).

On the other hand, in response to unsuccessfully fetching any cached version of the data object from the CaaS (L2) cache (106) (or a L2 cache miss, including but not limited to being caused by a cache eviction of the data object from the L2 cache), the cache services (118) proceed to invoke a cache object builder 138 to build the data object in the CaaS (L2) cache (106) and/or the L1 caches (130). The L2 cache miss can happen if the cached version of the data object does not exist in, or has expired from (e.g., beyond a TTL period, beyond an extended TTL period, etc.), the CaaS (L2) cache (106).

As used herein, building or loading a data object in cache means retrieving underlying data (or data entities) from a primary data source (e.g., 108, etc.), building an up-to-date version or value of the data object from the underlying data (and the data entities), and temporarily storing the up-to-date version of value of the data object in a global cache such as the CaaS (L2) (106). The cached version or value of the data object in the global cache is shared across all application threads (e.g., cache service consumers, etc.) or virtual machines in which the application threads are running.

In operational scenarios in which the data object is cached both in the global cache such as the CaaS (L2) cache (106) and in one or more local caches such as the L1 caches (130), building or loading the data object in cache may further include adding the cached data object into the L1 caches (if applicable), for example upon during processing subsequent read requests from cache service consumers.

To prevent inconsistency between the global cache represented by the CaaS (L2) cache (106) and the local caches represented by the L1 caches, the cache services (118) can be implemented with cache synchronization logic to ensure that the local caches (or the L1 caches (130)) work in sync with the global cache (or the CaaS (L2) cache). For instance, when a data object is built or rebuilt in the global cache, the same data object in the local caches (if any) can be marked for building or rebuilding to prevent any outdated values or any outdated cached versions of the data object from being served out from the local caches until the data object is built or rebuilt with the latest value or the latest cached version of the data object as cached in the global cache.

A data object can be built in cache synchronously or asynchronously, depending on whether a set of synchronous actions (or SYNC operations) or a set of asynchronous actions (or ASYNC operations) has been selected as a specific cache build strategy for the data object (e.g., a data entity, a custom entity, etc.).

2.3. Building Cached Data Objects Synchronously

For a data object to be built in cache synchronously, some or all corresponding SYNC operations can be performed through a (distributed) SYNC cache loader 134 in the cache object builder (138), as depicted in step 208 (denoted as "syncCacheLoad( )", which may be implemented as a cache service method or API call to be invoked by "getGlobalCache( )" in step 206) of FIG. 2A. The SYNC cache loader (134) can use a (cache) value provider associated with the data object to carry out these SYNC operations to build the data object in cache synchronously by making API calls including but not limited to object query language API calls, database connect API calls for executing callable statements, database statements, query statements, etc. The value provider associated with the data object may be implemented as an instance of a class, an object, a specific implementation of a class interface, a specific implementation of an abstract class, etc.

Multiple (e.g., N, etc.) application threads may concurrently attempt to read a cached version of the data object in need of building (or rebuilding) and trigger building the data object in cache. The SYNC cache loader (134) may use a distributed lock strategy (e.g., a lock arbitration algorithm, a first-in-first-out lock arbitration algorithm, a priority-based arbitration algorithm, etc.) to coordinate among the application threads and to ensure that only a single application thread (e.g., a single Java thread, etc.) is selected—from among all the N application threads that are concurrently making read requests for the data object—to carry out cache loading the data object from the primary data source (108).

Under the distributed lock strategy, a distributed (soft) lock key may be placed in the CaaS (106) in a system instance or a point of deployment (POD) for the data object and granted at a given time to only a single application thread among all the application threads in the system instance (or the POD) that are attempting to fetch the data object in need of building or rebuilding and triggering building the data object in cache.

The application thread that has been granted with the distributed lock key for the data object is allowed to build or rebuild the data object. All others application threads that have not been granted the distributed lock key for the data object are not allowed to build or rebuild the data object and have to wait (e.g., spin-wait, etc.) for an up-to-date cached version (or value) of the data object at least until the application thread that has been granted with the lock finishes building or rebuilding the data object in cache.

After the application thread that has been granted with the lock finishes building or rebuilding the data object in cache, the up-to-date cached version (or value) of the data object may be provided to all the requesting and waiting application threads in step 210 as a result returned from the method or API call "syncCacheLoad( )".

For example, once the global cache or the CaaS (L2) cache (106) is built or loaded with the up-to-date cached version of the data object by the single application thread with the distributed lock, all the other application threads (as well as the selected application thread if applicable) can fetch the up-to-date cached version of the data object from the global cache or the CaaS (L2) cache (106) in step 210, and possibly add the up-to-date cached version of the data object into their respective local caches (or L1 caches) if applicable or if permitted by the L1 cacheable whitelist in step 212.

During time periods (e.g., Monday, Weekday morning hours, right after lunch hours, etc.) in which the arrival rate of read requests as received by the cache services (118) for the same set of data objects to be built or rebuilt in cache can be relatively heavy or high, a soft lock-based strategy/mechanism as described herein ensures that only a single application thread is granted the distributed lock key at any given time to build or rebuilt a data object in cache. This strategy/mechanism prevents cache stampede scenarios in which a large number of application threads may all try to fall back on consuming network, database or other infrastructure resources to access underlying data (or data entities) persisted/stored in one or more primary data sources (e.g., 108, etc.) to build the same set of data objects in cache.

While the selected application thread with the granted lock is being used to build the data object in cache synchronously, all other concurrent application threads attempting to fetch the data object may or may not have to wait.

For example, a (TTL-expired but not state change invalidated) cached version of the data object in cache is returned to those other application threads in step 212, if all of the following conditions are true: a) the cached version of the data object has (time) lapsed beyond a TTL period but still within an extended TTL period beyond the TTL period, b) the cached version of the data object (or the cached data object) has not been invalidated due to data object state change(s), and c) the data object (or data entity) is designated for a state change based invalidation strategy.

On the other hand, no cached version of the data object is returned to those other application threads, if any of the foregoing conditions a) through c) is not true. Those other application threads enter a WAIT state until the SYNC operations for building the data object in cache is completed (or time out from the WAIT state).

To include or set up a specific data object for synchronous cache refreshing or loading in cache services (e.g., 118, etc.) as described herein, a number of on-boarding (or preparatory) steps may be taken. It should be noted that the setup operations as described herein are described by way of example but not limitation. Some or all of the setup operations may be applicable to other types of cache services other than synchronous refresh.

In a non-limiting implementation example, a cache data object wrapper—implemented in the shared cache service layer (102) in a mezzanine tier in between the UI tier (120) and the core tier (122) and designated with a corresponding target type—may be created in the cache services (118) for the data object. A target type as described herein may refer to a category of data, a data entity, a type of data object, a group of data fields derived (e.g., join, composite, etc.) from underlying data (or data entities) persisted in one or more primary data sources of a database system, etc. The cache object wrapper be used to encapsulates cacheable data (cached in the L1 and/or L2 caches) of the data object of the target type. The cache object wrapper along with (e.g., all, etc.) its children data fields (e.g., in the entire object graph identifying its children data fields, etc.) can be configured for the data object as serializable.

A cache key builder may be specifically set up or implemented for the data object. The cache services (118) can use or invoke the cache key builder to compute or generate a cache key (e.g., representing a composite value of a set values for a set of data fields used to identify a data object of a target type, etc.) for the data object as necessary (e.g., upon an invocation of the "getValue( )" method or API call in step 202 of FIG. 2A, etc.).

In some embodiments, the hash value is pre-appended in the cache key by some or all of: a static marker identifying the cache key as belonging to the cache services (118); an organization identifier, (optional) a network identification field, etc. Additionally, optionally or alternatively, the hash value may be post-appended in the cache key by a target type class name of the cache object wrapper for the data object for which the cache key is computed or generated. The static marker can be used to avoid possible key duplications between cache keys of the cache services (118) and other services of the multitenant computing system to the organization.

As the cache key comprise a hash value computed/generated with a hash function, there is a (e.g., theoretical, minimal, negligible, etc.) possibility of hash collision. However, given that a relatively long bit length (e.g., 128 bits, etc.) can be used in the hash function, for any realistic possible number of cache key entries within a single org (even multiplied by a factor of some large number X), the probability of collision is practically zero.

A cache key as described herein may be limited or constrained to be no more than a maximum cache key size, while fields or data therein of the data object, for example as defined by an organization to be used as input to a cache key builder to derive the cache key, may or may not be larger than the maximum cache key size. The total length of a string (or the total number of characters therein) representing the cache key may be limited to: one of 140, 210, 280, etc.

The cache key may comprise a composite of a plurality of (e.g., supported, etc.) fields constructed by the cache key builder through concatenating or appending operations. The cache key builder may use a hash function such as 128-bit murmur3 hash function to compute or generate a hash value of a certain size/length over the (e.g., supplied, supported, etc.) fields or data therein. The hash value generated by the hash function may be used or included in the cache key. The computation/generation of the cache key may happen within the cache service (118) and may be abstracted from the cache service consumers (132). A cache service consumer does not need to explicitly invoke the cache key builder, which may be automatically invoked internally within the cache services (118) in response to receiving a request for accessing a data object whose value is cached by the cache services (118).

For example, when a data provider controller object—used by a UI tier application to acquire data needed by the UI tier application—issues or invokes a "getValue( )" method or API call to make a read request for an up-to-date value of the data object, as a part of processing the read request, the cache services (118) can automatically invoke the cache key builder/creator and the cache value provider as appropriate in its internal operational logic.

In some embodiments, the hash key may be represented in a form as follow: "<static marker>/orgId/<optional>networkId/<hash>/<target type>". An example cache key is "SCK/00Dxx0000001k04/0DBxx00000000Bs/a00793e22df01c1a8ecf4c90c1ac6ea8/ArticleVersion Id". Here, "SCK" represents a static marker used for (e.g., all, etc.) cache keys generated in the cache services (118); "00Dxx0000001k04" represents an example of an organization identifier ("orgId"); "0DBxx00000000Bs" represents an example of a network identifier ("networkId"); "A00793e22df01c1a8ecf4c90c1ac6ea8" represents an example of a (computed) hash value over fields or data therein that are to be cached by the cache services (118); "ArticleVersionId" represents an example of the target type name of the cache object wrapper encapsulating cacheable (or cached data) for which this cache key is computed/generated.

A cache value provider may be specifically set up or implemented for the data object to be cached. The cache value provider can be used to encapsulate or implement underlying operational logic of building a (cacheable) value of the data object from data persisted/stored in a primary data source such as a database, in the case of cold cache (first time or initial cache loading of a data object) or a cache miss (before cache loading of the data object or after the last cached value of the data object has expired in cache).

In some operational scenarios, the organization to which the requested data object and the cache service consumers belong may provide a specific implementation of the cache value provider and the cache key builder. The specific implementation of the cache value provider and the cache key builder may make use of methods, APIs, interfaces, classes, class objects, etc., that have already been provided as infrastructure in the cache services (118).

The cache value provider may include a code segment implementing specific operational logic (e.g., a "doCompute( )" method or API call, etc.) to derive or generate a (cacheable) value of the data object based on underlying data (or data entities) persisted with the primary data source (108).

A (e.g., cacheable, cached, etc.) version or value of the data object to be cached in a cache as described herein such as the CaaS (L2) cache (106) may be serialized by an object serializer before inputting to the cache. The version or value of the data object may be deserialized by a corresponding object deserializer after retrieving from the cache.

The serializer and deserializer may be those provided (e.g., out-of-the-box, generic, possibly with security holes, etc.) in a programming language such as Java. Additionally, optionally or alternatively, the object serializer/deserializer may be specifically implemented (e.g., a custom version, with enhanced security over standard or 3rd party object serializer/deserializer by language provider, etc.).

A data object deserializing whitelist may be used to provide additional security. The list identifies or specifies data objects whose cached versions or values temporarily stored in the CaaS (L2) cache (106) can be deserialized. The object deserializer (e.g., with custom or specific implementation, etc.) may filter all attempts to deserialize a cached version or value of a data object based on the data object deserializing whitelist. In response to determining that the data object is identified or specified by the whitelist as deserializable, the object deserializer can proceed to deserialize the cached version of value of the data object. On the other hand, in response to determining that the data object is not identified or specified by the whitelist as deserializable, the object deserializer can deny the attempts to deserialize the cached version of value of the data object.

In some operational scenarios, the entire object graph of the data object needs to be whitelisted in order for the data object to be deserializable for cache service consumers (e.g., in a UI tier, in a mezzanine tier, etc.).

Additionally, optionally or alternatively, adding a data object to the whitelist to allow the data object may be done through wildcard expressions (e.g., a regular expression containing wildcard notations, etc.) or through package-based expressions. Member data objects within the cache object graph of the (parent) data object also need to be whitelisted if the member data objects have not been covered by any wildcard expressions or package-based expressions as deserializable.

Additionally, optionally or alternatively, a class or class object that is extended from a data object identified by the whitelist as deserializable may be considered or deemed as (e.g., implicitly, etc.) deserializable.

A "getValue( )" or "getValueWithNoLoad( )" method or API call or the like can be implemented as a part of publicly consumable APIs via a cache service access point class or class object (e.g., "ScaleCacheUtilWrapper", etc.) exposed by the cache services (118) to cache service consumers.

A cache service consumer (e.g., an application thread, etc.) can invoke the "getValue( )" or "getValueWithNoLoad( )" method or API call to consume cache services (e.g., read requests, etc.) of one or more data objects. The "getValue( )" method or API call may cause a cached version of a data object to be loaded in cache synchronously if the cached version is missing or invalidated in cache, whereas the "getValueWithNoLoad( )" method or API call may not cause a cached version of any of one or more data objects identified in the method or API call to be loaded in cache even if the cached version of any of one or more data objects is missing or invalidated in cache.

2.4. Building Cached Data Objects Asynchronously

For a data object to be built in cache asynchronously, some or all corresponding ASYNC operations can be caused to be performed through an ASYNC cache loader 142 in the cache builder (138) and a cache message enqueuer 136 in an ASYNC cache message handler 126.

For example, in step 218 (denoted as "asyncCacheLoad( )", which may be implemented as a cache service method or API call to be invoked by "getGlobalCache( )" in step 206) of FIG. 2B, the ASYNC cache loader (142) sends a request to the message handler (126) for the purpose of causing asynchronous cache refresh operations to be performed for the data object. The request may be sent or communicated to the ASYNC cache message handler (126) in a (e.g., private, etc.) REST API call 254 with a cache value provider (class or class object) instance constructed by the ASYNC cache loader (142) as input. The REST API call (254) triggers the ASYNC cache message handler (126) or the cache message enqueuer (136) therein to perform message enqueuing operations and returns immediately without blocking the application thread invoking the REST API call (254).

In response to the request from the ASYNC cache loader (142) in the REST API call (254), the ASYNC cache message handler (126) or the cache message enqueuer (136) therein uses an invokable ASYNC cache refresh action to cause a message enqueuing method or API call 256 (denoted as "createQueueMessage( )") to enqueue a queue message representing an asynchronous cache refresh request into the MQ (144). The invokable ASYNC cache refresh action may be identified in a mapping or mapper set up by the cache services (118) for the ASYNC cache message handler (126) with a corresponding action type enum value.

A cache message dequeuer 140 in the ASYNC cache message handler (126) in the core tier (104) that services or listens to the MQ (144) uses a message dequeuing method or API call 258 (denoted as "handleMessage( )") to respond asynchronously to the event of the queue message representing the asynchronous cache refresh request being enqueued into the MQ (144), dequeue the asynchronous cache refresh request, use operational parameters passed with the asynchronous cache refresh request to build a cache key for the data object and an up-to-date cached value of the data object, and store the up-to-date cached value of the data object for the cache key in cache.

Here, the cache message dequeuer (140) or the message dequeuing method or API call 258 ("handleMessage( )") that performs asynchronous cache loading/refreshing for the data object can be executed in a background or backend thread that is separate from application threads making the read requests for the data object.

On dequeuing (the queue message representing) the asynchronous cache refresh request, the cache message dequeuer (140) (or the message dequeuing method or API call 258 ("handleMessage( )")) can invoke a cache service method or API call "buildCache( )" with a cache key builder and a cache value provider. The cache service method or API call "buildCache( )" uses the cache key builder to generate a cache key for the data object, uses the cache value provider to construct an up-to-date value of the data object, and caches the up-to-date value of the data object in the CaaS (L2) cache (106) for the cache key. Any subsequent read requests for the data object can be satisfied by fetch the up-to-date value of the data object from cache.

As a part of dequeuing/servicing the asynchronous cache refresh request, the cache message dequeuer (140) can use the cache value provider associated with the data object to carry out the ASYNC operations to build the data object in cache asynchronously by making API calls, which may include but are not necessarily limited to, any of: object query language API calls, database connect API calls for executing callable statements, database statements, query statements, etc. The value provider associated with the data object may be implemented as an instance of a class, an object, a specific implementation of a class interface, a specific implementation of an abstract class, etc.

While the backend thread is being used to build the data object in cache asynchronously, all application threads attempting to fetch the data object may or may not obtain a cached version of the data object depending on certain conditions.

More specifically, a (TTL-expired but not state change invalidated) cached version of the data object in cache is returned to those application threads in step 220, if all of the following conditions are true: a) the cached version of the data object has (time) lapsed beyond a TTL period but still within an extended TTL period beyond the TTL period, b) the cached version of the data object (or the cached data object) has not been invalidated due to data object state change(s), and c) the data object (or data entity) is designated for a state change based invalidation strategy.

On the other hand, a null (or a null result response) is returned to those application threads in step 220, if any of the foregoing conditions a) through c) is not true. Those application threads (or cache service consumers) may implement operational logic to handle this case.

Additionally, optionally or alternatively, after the backend thread finishes building or rebuilding the data object in cache, the up-to-date cached version (or value) of the data object may be provided to all the requesting and waiting application threads in step 220, for example by way of a result handler or an attendant processing thread that was registered as a callback when the asynchronous cache refresh request was enqueued to the MQ (144).

As discussed, building/loading/refreshing a data object in cache from persisted underlying data (or data entities) in and retrieved from a primary data source (e.g., 108, etc.) can be carried out asynchronously, leveraging an MQ framework implemented in a multitenant computing system. Example use cases in which cache service consumers (e.g., in a UI tier, in a core tier, etc.) take this approach include, but are not necessarily limited to only, use cases in which it is relatively expensive for building or loading a data object in cache from the primary data source (108) to be undertaken in a foreground thread (e.g., server side rendering in communities of an organization, etc.).

To include or set up a specific data object for asynchronous cache refreshing or loading in cache services (e.g., 118, etc.) as described herein, a number of on-boarding (or preparatory) steps may be taken. It should be noted that the setup operations as described herein are described by way of example but not limitation. Some or all of the setup operations may be applicable to other types of cache services other than asynchronous refresh.

In a non-limiting implementation example, a cache data object wrapper—implemented in the shared cache service layer (102) in a mezzanine tier in between the UI tier (120) and the core tier (122) and designated with a corresponding target type—may be created in the cache services (118) for the data object. The cache object wrapper be used to encapsulates cacheable data (cached in the L1 and/or L2 caches) of the data object. The cache object wrapper along with (e.g., all, etc.) its children data fields (e.g., in the entire object graph identifying its children data fields, etc.) can be configured for the data object as serializable.

A cache key builder may be specifically set up or implemented for the data object, as in the case of synchronous cache refreshing or loading as previously discussed. The cache services (118) can use or invoke the cache key builder to compute or generate a cache key for the data object as necessary (e.g., upon an invocation of the "getValueWithAsyncRefresh( )" method or API call in step 202 of FIG. 2B, etc.).

A cache value provider may be specifically set up or implemented for the data object to be cached, as in the case of synchronous cache refreshing or loading as previously discussed. The cache value provider can be used to encapsulate underlying operational logic of building a (cacheable) value of the data object from a primary data source such as a database, in the case of cold cache (first time cache loading of a data object) or a cache miss (before cache loading of the data object or after the last cached value of the data object has expired in cache).

In some operational scenarios, the organization to which the cache service consumers belong may provide a specific implementation of the cache value provider and the cache key builder. The specific implementation of the cache value provider and the cache key builder may make use of methods, APIs, interfaces, classes, class objects, etc., that have already been provided as infrastructure in the cache services (118).

A cache service consumer does not need to explicitly invoke the cache key builder and the cache value provider, which may be automatically invoked internally within the cache services (118) in response to receiving a request for accessing a data object whose value is cached by the cache services (118).

For example, when a cache builder invoked by the cache message dequeuer (140) can automatically invoke the cache key builder/creator and the cache value provider as appropriate in its internal operational logic.

A data object deserializing whitelist may be used to provide additional security, as in the case of synchronous cache refreshing or loading as previously discussed.

A "getValueWithAsyncRefresh( )" method or API call or the like can be implemented as a part of publicly consumable APIs via a cache service access point class or class object (e.g., "ScaleCacheUtilWrapper", etc.) exposed by the cache services (118) to cache service consumers.

A cache service consumer (e.g., an application thread, etc.) can invoke the "getValueWithAsyncRefresh( )" method or API call to consume cache services (e.g., read requests, etc.) of a data object. The "getValueWithAsyncRefresh( )" method or API call may cause a cached version of the data object to be loaded in cache asynchronously if the cached version is missing or invalidated in cache.

The "getValueWithAsyncRefresh( )" method or API call can take a number of operational parameters including but not limited to REST operational parameters (e.g., a REST connection object, etc.), cache key parameters used in a cache key builder/creator, etc. In some embodiments, an asynchronous refresh data wrapper object may be used in the "getValueWithAsyncRefresh( )" method or API call to encapsulate some or all of the operational parameters. Example operational parameters encapsulated in the asynchronous refresh data wrapper object may include, but are not necessarily limited to only, any of: an organization identifier for the organization to which the data object belongs; a network identifier; a target type (or a target type class name) representing a class name of a cache object wrapper used to encapsulate cacheable data; operational parameters for creating a cache key builder; a time-to-live value for the data object; operational parameters for creating a cache value provider; and so forth.

The REST operational parameters may be used by the ASYNC cache loader (142) to determine/establish a REST request object and to execute a corresponding REST request to cause the ASYNC message enqueuer (136) to enqueue an asynchronous cache refresh request into the MQ (144) based on the REST request object.

The cache key parameters may be used by a cache key builder/creator—e.g., in the "buildCache( )" method or API call invoked upon dequeuing the asynchronous cache refresh request from the MQ (144)—to generate a cache key that serves to identify the REST request.

The asynchronous refresh data wrapper object can be used by a cache value provider—e.g., in the "buildCache( )" method or API call invoked upon dequeuing the asynchronous cache refresh request from the MQ (144)—to construct an up-to-date value of the data object.

The "getValueWithAsyncRefresh( )" method or API call returns a cached value of the data object if such value is validly cached, or return null otherwise.

An action type enum value as described herein that is used to identify an invokable ASYNC cache refresh action for a data object can be defined, specified and/or set up in a first (e.g., final, etc.) map object in the cache services (118) in advance such as before a compile time, at a compile time, before the cache services (118) support access to the data object, and so forth.

The action type enum value can be further mapped to a corresponding message handler (e.g., specific to the data object, etc.) used to enqueue or dequeue asynchronous cache refresh requests for the data object in a second (e.g., final, etc.) map object in the cache services (118) in advance such as before a compile time, at a compile time, before the cache services (118) support access to the data object, and so forth.

A bean (e.g., a java bean, etc.) may be added for the message handler to which the action type enum value is mapped. The bean may be used to listen to and process events related to enqueuing or dequeuing asynchronous cache refresh requests for the data object in the MQ (144).

The message handler used to enqueue or dequeue asynchronous cache refresh requests for the data object may be implemented to include a set of methods or API calls. The set of methods or API calls may include, but are not necessarily limited to only, a "createQueueMessage( )" method or API call used to enqueue the asynchronous cache refresh requests for the data object, a "handleMessage( )" method or API call used to dequeue the asynchronous cache refresh requests for the data object, etc.

The "createQueueMessage( )" method or API call may be implemented with operational logic to put operational parameters into (e.g., an asynchronous refresh data wrapper object included in, etc.) an asynchronous cache refresh request as described herein. The asynchronous cache refresh request with the operational parameters as created by the "createQueueMessage( )" method or API call can then be enqueued into the MQ (144).

The "handleMessage( )" method or API call may be implemented with operational logic to retrieve operational parameters from (e.g., an asynchronous refresh data wrapper object included in, etc.) a dequeued asynchronous cache refresh request as described herein, to construct a cache key builder and a cache value provider based at least in part on some or all of the operational parameters, to invoke other methods or API calls such as the "buildCache" method or API call as necessary to carry out cache refreshing/loading of the data object, etc.

2.5. Invalidating Cached Data Objects

An object state change based invalidation strategy may be implemented in some use cases to explicitly invalidate a cached version/value of a data object upon mutation of underlying data giving rise to the cached version/value of the data object. These use cases include, but are not necessarily limited to only, use cases in which a staled cached version/value of the data object is not appropriate to be used to satisfy read requests for the data object, use cases in which traffic patterns (e.g., arrival rate patterns, etc.) of read requests need a relatively long TTL (e.g., >=24 hours, greater than 8 hours, etc.) for yielding healthy cache hit ratios.

An example use case in which a relatively long TTL is appropriate is serving community knowledge articles. An organization hosted in the multitenant computing system may operate with one or more communities. A community may have articles (and corresponding article feeds) to be accessed with read requests by users in the organization or in the community. Such article access may have a relatively wide data access pattern in which article reads (or read request for articles) can spread across tens of thousands of distinct articles over the course of a relatively long time period such as 8 hours, a business day, a calendar day, a duration of an event, etc. In this use case, the per-article access/read rate may be rather low (e.g., only a few times per day, etc.), but in aggregate the total number of article accesses/reads or the total article data volume/throughput created by these article accesses/reads over a relatively long time period may still be sufficiently high to warrant caching of these article. Another example use case in which a relatively long TTL is appropriate but to a lesser extent is serving information related to a variety of topics (or topics feeds in a wide array of topics dataset). Additionally, optionally or alternatively, an example use case in which a relatively long TTL may be appropriate is a user who reads cached data (e.g., with a cache service consumer object or a cache service consumer application thread, etc.) whose underlying data persisted/stored in the database system is directly mutable by the user. When the user performs a data manipulation operation to mutate the underlying data persisted/stored in the database system, the cached data needs to be invalidated with a write transaction commit of the data manipulation operation.

For these use cases, a low TTL (e.g., minutes, etc.) may yield relatively low cache hit rates. On the other hand, extending the TTL is constrained or bounded due to possible cached data staleness issues. The object state change based invalidation strategy can be implemented to allow these use cases to have a relatively large TTL (e.g., 8 hours, 24 hours, etc.) in combination with object state change based invalidation of cached data; upon cache object state mutation (in the database system through write paths/operations of underlying data), the cached data (or a cached version/value of a data object) can be invalidated in cache such as a global cache, the CaaS (L2) cache (106), etc.

A cached version of a data object in cache (or a cached data object) may be invalidated by a cache invalidator 124 as shown in FIG. 1C. The cache invalidator (124) may carry out cached data object invalidations through a transaction observer, through invalidation API calls invoked from a processing thread (e.g., an application thread, a platform thread, etc.) on a write path, and so forth.

In operational scenarios in which a transaction observer has been designated to invalidate a cached data object, the transaction observer may be notified of (e.g., database, primary data source, etc.) write operations on underlying data entities that give rise to the cached data object. In response to receiving such notification, the transaction observer invalidates the cached data object.

In operational scenarios in which invalidation API calls invoked from a processing thread on a write path has been designated to invalidate a cached data object, the processing thread on the write path may perform write operations on underlying data entities that give rise to the cached data object as well as invoke the invalidation API calls to invalidate the cached data object.

In some operational scenarios, cached data object invalidations are (e.g., only, etc.) supported or performed from within the core tier (or a tier in which MQ functionality is implemented or resides). The cache invalidator (124) may rely on MQ for retries in case invalidation request enqueuing failures occur in a (e.g., SYNC, foreground, etc.) application thread (e.g., located in a different tier, etc.), for example due to intermittent network failures or problems. A message (including but not limited to a cache invalidation request, a cache refresh request, etc.) failed to be enqueued into MQ may be periodically retried by the MQ functionality implemented in the core tier until the message is successfully enqueued. As a result, a cached data object invalidation affecting a cached data object is not to be missed by the cache services (118) under any of these failure or error conditions.

Figure 3A:
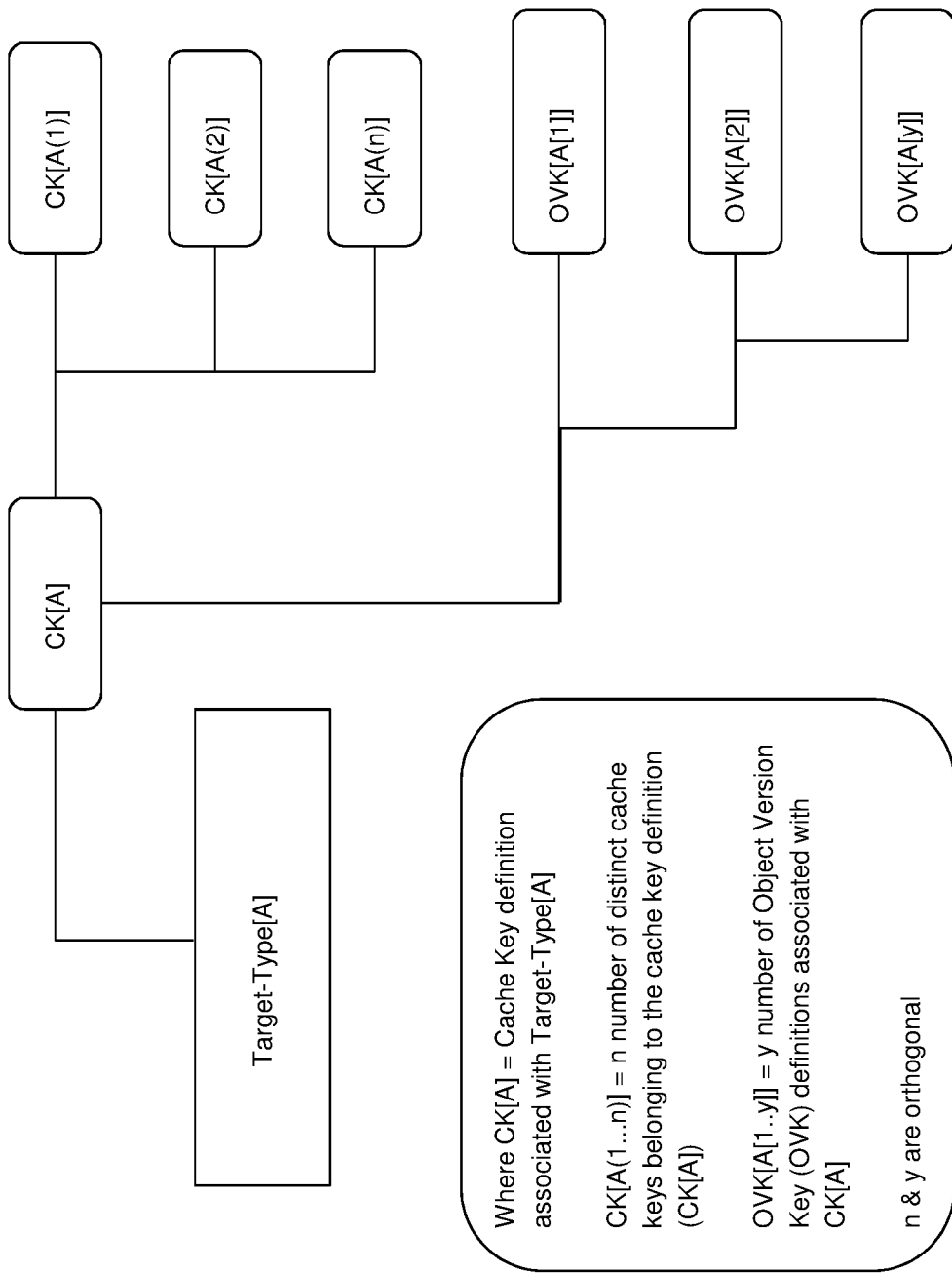
FIG. 3A through FIG. 3D illustrate example visual layouts of (or example relationships among) target types, corresponding cache key definitions, and object version key definitions.

FIG. 3A illustrates an example visual layout of (or example relationships among) target types (e.g., in a target type array "Target-Type[A]"), corresponding cache key definitions (e.g., in a cache key definition array "CK[A]"), and object version key definitions (e.g., in object version key definition arrays "ovk[A[1]]", "ovk[A[2]]", . . . , "ovk[A[k]]").

Each target type in the target types (or the target type array "Target-Type[A]") may be represented by a corresponding cache object wrapper encapsulating cached (e.g., already cached, to-be-cached, to be refreshed, to be loaded or reloaded in cache, etc.) data of data objects of the target type. Different data objects (or instances) of the target type can be represented by their respective instances of the corresponding cache object wrapper. In other words, the different data objects of the target type can be represented by their respective sets of cached data in the respective instances of the corresponding cache object wrapper representing the target type.

Each target type in the target types (or the target type array "Target-Type[A]") may be associated, specified and/or implemented with a corresponding cache key definition in the corresponding cache key definitions (or the cache key definition array "CK[A]"). A cache key builder/creator (accessible through the corresponding cache object wrapper) may be used to implement based on the corresponding cache key definition to generate or create different cache key values for different data objects of each such target type from their respective sets of cached data in the respective instances of the corresponding cache object wrapper representing the target type.

Each target type in the target types (or the target type array "Target-Type[A]") may be associated, specified and/or implemented with a set of corresponding object version key definitions (or the object version key definition arrays "ovk[A[1]]", "ovk[A[2]]", . . . , "ovk[A[k]]"). Each object version key definition in the set of corresponding object version key definitions for the target type may be used to track a corresponding type of changes to underlying data giving rise to cached (or cacheable) data of data objects of the target types.

As illustrated in FIG. 3A, for a target type, a corresponding cache key definition (e.g., CK[A], etc.) may be implemented by a cache key builder/creator as described herein to generate n distinct cache keys (denoted as CK[A(1)], CK[A(2)], . . . , CK[A(n)]]) from n sets of cached data in n data objects of the target type, where n represents a positive integer.

In addition, the target type may be associated, specified and/or implemented with y number of object version key (OVK) definitions (constituting a set of corresponding OVK definitions for the target type) to generate (OVK) version numbers for tracking changes to underlying data entities that give rise to (e.g., that are used to generate, etc.) cached data of the data objects of the target type, where y is a positive integer. A data entity may refer to a data table, a data set, etc., that comprises one or more rows or records each of which comprises data field (or table column) values for one or more data fields (or table columns) defined for the data entity.

It should be noted that the number (n) of distinct cache key definitions for the target type and the number (y) of distinct OVK definitions for the target type may be orthogonal and independent of each other.

Figure 1D:
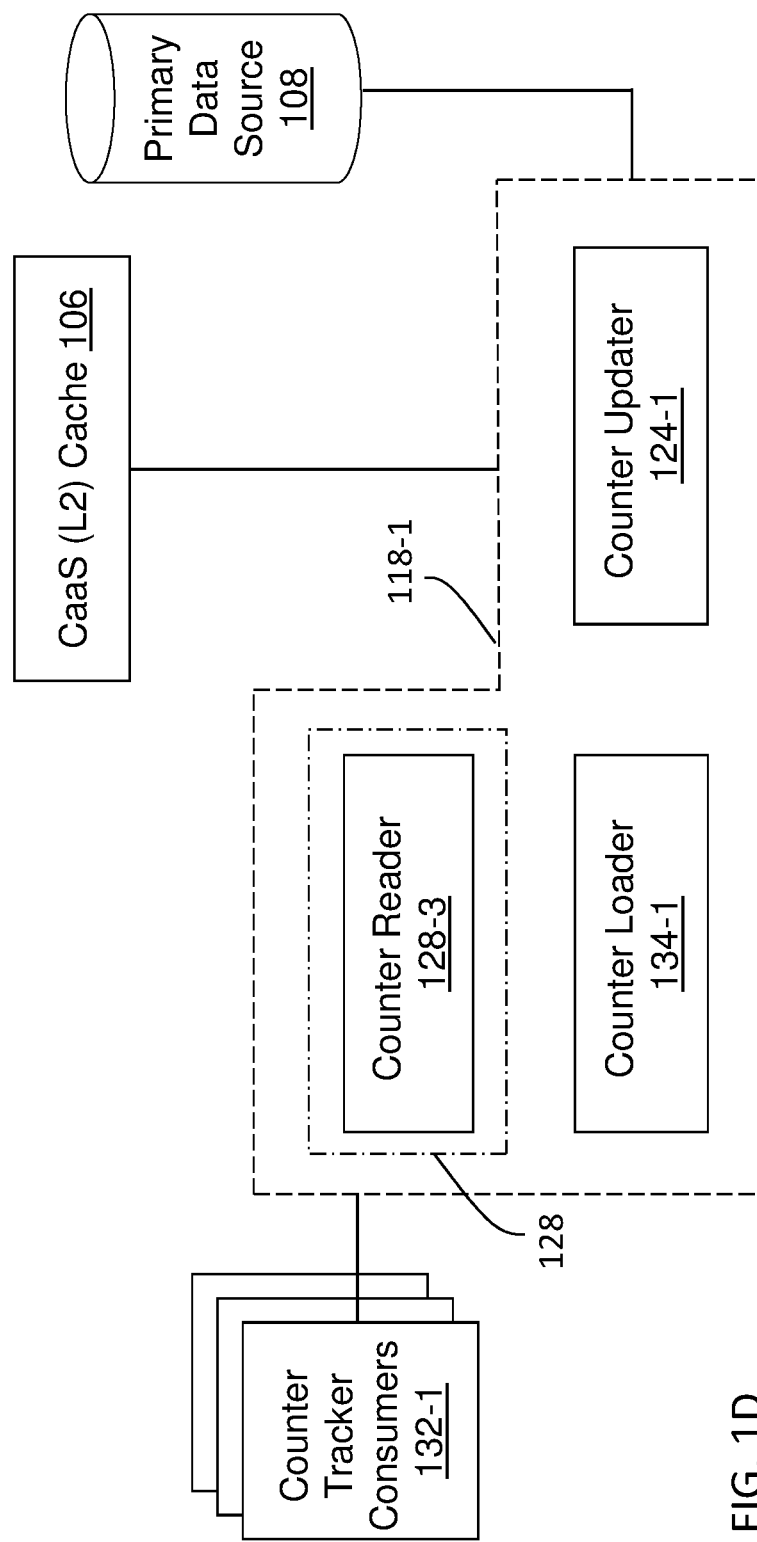
FIG. 1D illustrates example components of counter tracker services.

Based at least in part on the relationships among the target types, the corresponding cache key definitions and the corresponding object version key definitions, cache services (e.g., 118 of FIG. 1B or FIG. 1C, etc.) as described herein can use a global cache such as the CaaS (L2) cache (106) of FIG. 1C or FIG. 1D to keep all data for versioning scheme management for the cached versions/values of the data objects in the global cache, without needing to access the underlying data in the database system for the purpose of determining whether any of the cached versions/values of the data objects in the global cache becomes staled (e.g., different from, or outdated as compared with, the underlying data persisted/stored in the database system, etc.) at any given time point in runtime.

Instead of relying on accessing the underlying data in the database system for the purpose of determining staleness or non-staleness of the cached version/values of the data objects, the cache services (118) can (e.g., entirely, etc.) access or use some or all of the data for versioning scheme management maintained in its own global cache (or its own memory space outside the database system) to determine whether any of the cached versions/values of the data objects in the global cache becomes staled (e.g., different from the underlying data, etc.) at a given time point. As used herein, data for versioning scheme management refers to data for managing and determining version changes of cached data due to changes of underlying data giving rise to the cached data.

At a given time, each target type can have 1 to y associated write action types of which write actions/operations have possibly acted on or have altered underlying data that gives rise to cached data of data objects of the target type, thereby mutating the (e.g., staleness, non-staleness, etc.) state of the representation of the target type in the data objects. Here, the state of the representation of the target type in a data object refers to a specific value composition of the cached data encapsulated in the data object of the target type at a given time point.

Each distinct write action type in the y write action types corresponds to (or is modeled by) a respective OVK definition in the y OVK definitions. OVK version numbers generated based on the respective OVK definition—to which the distinct write action type corresponds to (or is modeled by)—can be used to track/maintain the latest version numbers at (atomic) row level of underlying data (or data entities) used to generate cached data of data objects in the global cache in relation to write actions of the distinct write action type.

Each cache key generated by the cache key definition to which the target type corresponds may be (e.g., implicitly, etc.) associated with (data changes as tracked by) 1 to y OVK definitions to which the target type corresponds. Version check operations (e.g., as part of processing read requests, etc.) may be performed for any given cache key of the cache keys (for the target type) in the global cache based on OVK version numbers generated for underlying data (or data entities, for example at a row level) based on some or all of 1 to y OVK definitions.

For example, the cache services (118) can determine whether any of the OVK version numbers generated for the underlying data (or the data entities at the row level) used to derive a cached version/value of a data object to which the cache key corresponds has been changed or incremented.

In response to determining that at least one of the OVK version numbers has been changed or incremented, the cache services (118) can determine or infer that the cached version/value of the data object to which the cache key corresponds becomes stale. On the other hand, in response to determining that none of the OVK version numbers has been changed or incremented, the cache services (118) can determine or infer that the cached version/value of the data object to which the cache key corresponds is still current, up to date, and/or not invalidated.

In response to determining, based on the OVK version numbers generated based on some or all of 1 to y OVK definitions, that the cached version/value of the data object to which the cache key corresponds is stale, then the cache services (118) can prevent the cached version/value of the data object from being returned to a cache service consumer in response to a read request for the data object originated from the cache service consumer.

On the other hand, in response to determining, based on the OVK version numbers generated based on some or all of 1 to y OVK definitions, that the cached version/value of the data object to which the cache key corresponds is not stale, then the cache services (118) can return the cached version/ value of the data object to the cache service consumer in response to the read request for the data object.

As a result, any returned cached version/value of a data object from the global cache is ensured to be the latest (or up-to-date and valid).

An OVK version number of underlying data (or a data entity, for example at the row level) may be generated and maintained as a part of cache service metadata information associated with a cached version/value of a data object generated based on the underlying data. By way of example but not limitation, the OVK version number may simply be a type long integer, which may be seeded with an initial (type long integer) value seeded generated from an OVK version number initialization algorithm. The OVK version number may be (atomically) incremented anytime a (matching) write action to the underlying data (the data entity at the row level) designed to be tracked by one of the OVK definitions occurs. The OVK version number may be initialized upon either a read action or a write action (e.g., whichever comes first, etc.) involving the data object or the underlying data. In some operational scenarios, the OVK version number initialization algorithm may seed or supply the initial value (anytime when the OVK version number is to be initialized) in a way that makes it virtually impossible (e.g., ever-increasing values, rolling over to unused values over time, use random initial values that are unlikely to have been seen by the system before, use non-repetitive values that are unlikely to have been seen by the system before, etc.) for the seeded/supplied value to be one that has ever been seen before (for the same cache key) for the purpose of eliminating possibilities of confusing or misidentifying present values of OVK version numbers with previous values of the OVK version numbers.

OVK definitions for a target type may be (by-design) decoupled from a cache key definition for the same target type. This allows a flexible design adaptive to various write action (or write path) scenarios in which inferring or determining a complete cache key may not be possible. In an example, a given cache key definition may specify a composite of [Field[A], Field[B], Field[C]] to be used in generating cache keys; however, in some write action/path scenarios, Field[A] and Field[B] but not Field[C] are available on these write path. In another example, there may be multiple (distinct) sets of write actions each set with a different set of key fields—including but not limited to data fields for generating cache keys—that can invalidate a given cache version/value of a data object, with no or little possibility of inferring a complete cache key associated with the cached data object from (data field values available in) each individual write action.

In many operational scenarios, relationships between a cache key definition for a target type and OVK definitions for the same target type may be many-to-many. A single cache key generated based on the cache key definition can be associated with multiple OVK definitions (and/or OVK version numbers), as multiple write action types may affect the state of a cached version/value of a data object corresponding to the cache key. Conversely, a single OVK definition can be associated with multiple cache keys generated based on the cache key definition, as a write action type tracked by the OVK definition may change underlying data (or data entities) giving rise to cached versions/values of multiple data objects as identified by the multiple cache keys in the global cache.

Figure 3B:
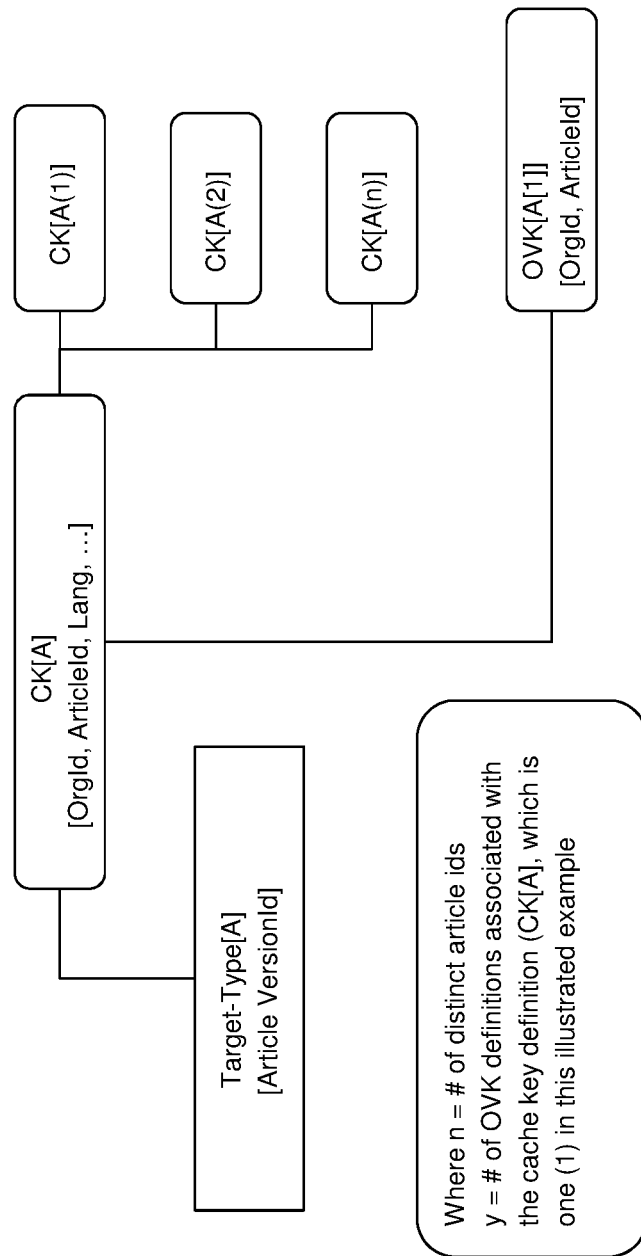

FIG. 3B illustrates an example visual layout of (or example relationships among) a target type ("Article VersionId"), a corresponding cache key definition (based on key fields "[OrgId, ArticleId, Lang, . . . ]"), and a set of OVK definitions comprising a single object version key definition ("OVK[A[1]]") used to generate OVK version numbers that track data changes (or invalidations) caused by write actions or CUD (stands for "create, update, delete") operations on underlying data (or a data entity storing various data field values persisted/stored in the database system) that gives rise to (or that is used to generate) each distinct published/online knowledge article as identified by data fields "[OrgId, ArticleId]".

The target type may be represented by a cache object wrapper each instance of which encapsulates a published/online article version identifier ("Article VersionId") for a given article identifier ("ArticleId") as cacheable data. In this illustrated example, the cache key definition ("CK[A]") is associated with a single OVK definition ("OVK[A[1]]") responsible for tracking invalidations against (or caused by) CUD operations on the underlying data used to derive/generate each published/online knowledge article as identified by a corresponding cache key. The underlying data (e.g., article content, other fields of the article, etc.) for each such knowledge article may come from the corresponding data entity (e.g., a "KnowledgeArticleVersion" entity type, at a row level, etc.) that is persisted/stored in the database system.

A write action (or a CUD operation) may be performed on underlying data (or data entity) for an article. Example write actions on knowledge articles (or knowledge article actions) may include, but are not necessarily limited to only, any of: article publishing/unpublishing, article addition/deletion/modification, article citing/un-citing, article comment addition, deletion and/or modification, etc. The write action on the underlying data (or data entity) may be identified or distinguished by (values in) data fields "[OrgId, ArticleId]" according to the OVK key definition. In response to the occurrence of the write action, an OVK version number generated for the underlying data (or the data entity at the row level) based on the OVK definition may be incremented. Such an OVK version number for underlying data (or the data entity) giving rise to a cached version of a published/online article version identifier ("Article VersionId") for a given article or article identifier ("ArticleId") can be used (e.g., for comparison with a previous OVK version number for the same data entity, etc.) by the cache services (118) to determine whether at any given time point the cached version of the published/online article version identifier ("Article VersionId") is current, up to date, and/or valid.

In some operational scenarios, use cases for tracking invalidations (or incrementing OVK numbers in response to write actions/operations) in knowledge articles may use invalidation API calls. The invalidation API calls that have been placed in or with write actions/paths can queue or invoke invalidations as caused by a list of knowledge article write actions or CUD operations on underlying data or data entities in the cache services (118) or in the global cache therein.

Figure 3C:
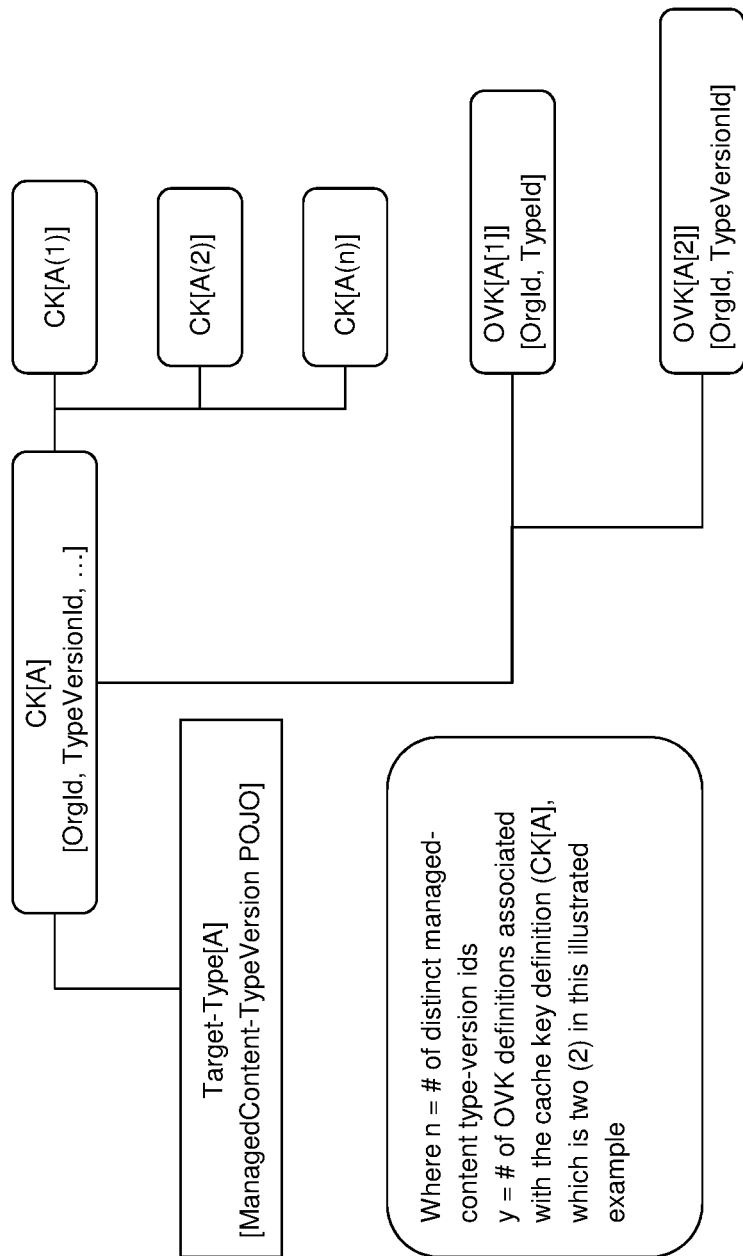

FIG. 3C illustrates an example visual layout of (or example relationships among) a target type ("ManagedContent-TypeVersion POJO"), a corresponding cache key definition (based on key fields "[OrgId, TypeVersionId, . . . ]"), and a set of OVK definitions comprising two OVK definitions ("OVK[A[1]]" and "OVK[A[2]]") used to generate OVK version numbers that track data changes (or invalidations) caused by write actions or CUD operations on underlying data (or data entities) for each instance of the target type ("ManagedContent-TypeVersion POJO").

The target type ("ManagedContent-TypeVersion POJO") may be represented by a cache object wrapper such as a plain old Java object (POJO) named "ManagedContent-TypeVersion", each instance of which encapsulates a given managed-content-type-version identifier as cacheable data. In this illustrated example, the cache key definition ("CK[A]") is associated with two OVK definitions ("OVK[A[1]]" and "OVK[A[2]]") responsible for tracking invalidations caused by write actions or CUD operations on underlying data (or two data entities "ManagedContentType" and "ManagedContentTypeVersion", for example at a row level) used to derive each instance of the target type "Managed-Content-TypeVersion POJO" as identified by a corresponding cache key generated based on the cache key definition ("CK[A]").

The underlying data (or the two data entities "Managed-ContentType" and "ManagedContentTypeVersion" at the row level) used to derive cacheable data in each instance of the target type ("ManagedContent-TypeVersion POJO") is persisted/stored in the database system.

The POJO, or each instance thereof, encapsulates information computed via a join between the data entities "ManagedContentTypeVersion" and "ManagedContentType" (of two different data entity types). The two data entity types have a parent-child relationship between each other.

The cache key definition (CK[A]) is associated with two OVK definitions (OVK[A[1]] and OVK[A[2]]) to accommodate this relationship. The first OVK definition ("OVK[A[1]]") comprises, or is identified/distinguished with, data fields "OrgId" and "TypeId" as member sub-keys, whereas the second OVK definition ("OVK[A[2]]") comprises, or is identified/distinguished with, data fields "OrgId" and "TypeVersionId" as member sub-keys.

The first OVK definition ("OVK[A[1]]") tracks invalidations caused by write actions or CUD operations performed on the data entity "ManagedContentType", whereas the second OVK definition ("OVK[A[2]]") tracks caused by write actions or CUD operations on the data entity "ManagedContentTypeVersion". A change to any of these two data entities (or data entity types) invalidates cached versions/data of corresponding instances of this target type ("ManagedContent-TypeVersion POJO").

In response to an occurrence of a write action (or a CUD operation) on the first data entity ("ManagedContentType"), the cache services (118) or the cache invalidator (124) therein can increment first OVK version number(s) (e.g., associated with a given set of member sub-keys identified/specified in the write action, etc.) generated for the first data entity ("ManagedContentType") based on the first OVK key definition ("OVK[A[1]]"). In response to an occurrence of a write action (or a CUD operation) on the second data entity ("ManagedContentTypeVersion"), the cache services (118) or the cache invalidator (124) therein can increment second OVK version number(s) (e.g., associated with a given set of member sub-keys identified/specified in the write action, etc.) generated for the second data entity ("ManagedContentTypeVersion") based on the second OVK key definition ("OVK[A[2]]").

In some operational scenarios, use cases for tracking invalidations as related to the target type ("ManagedContent-TypeVersion POJO") may use a transaction observer to queue or invoke invalidations as caused by write actions or CUD operations on underlying data (or the data entities) in the cache services (118) or in the global cache therein.

Figure 3D:
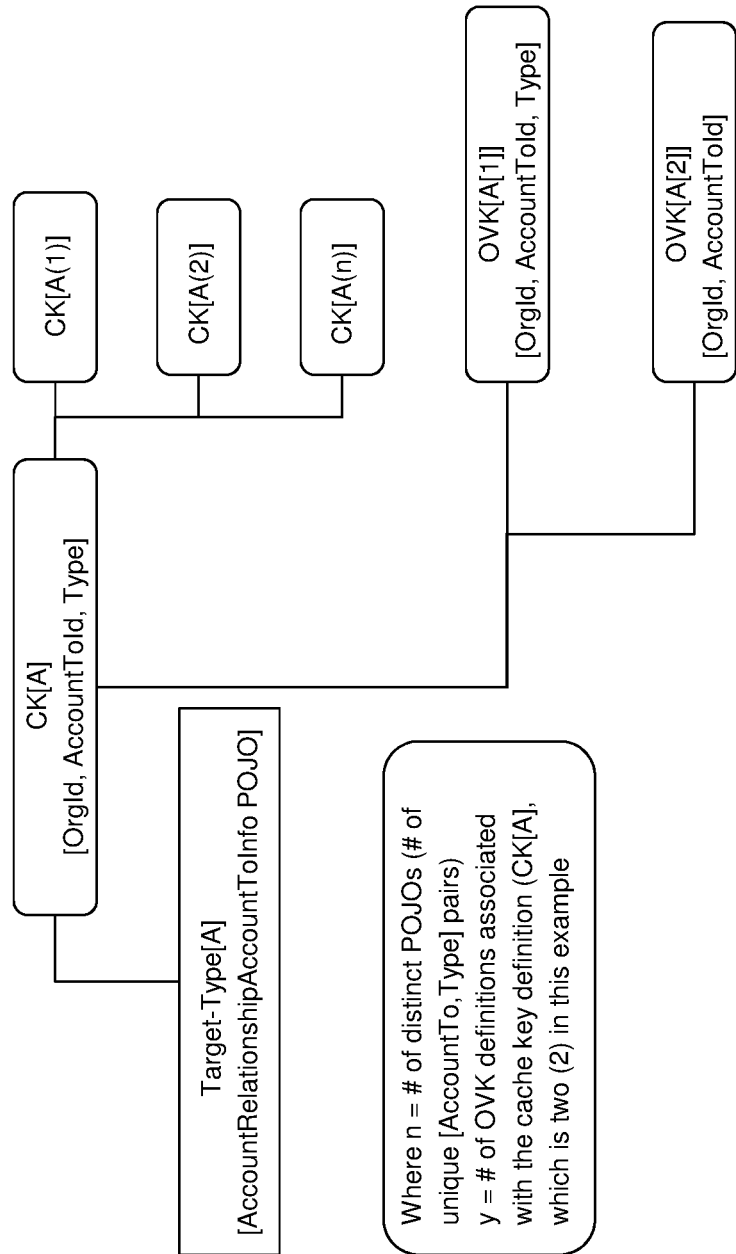

FIG. 3D illustrates an example visual layout of (or example relationships among) a target type ("AccountRelationshipAccountToInfo POJO"), a corresponding cache key definition (based on data fields or member sub-keys "[OrgId, AccountToId, Type]"), and a set of OVK definitions comprising two OVK definitions ("OVK[A[1]]" and "OVK[A[2]]") used to generate OVK version numbers that track data changes (or invalidations) caused by write actions or CUD operations on underlying data (or data entities, for example at a row level) used to derive cacheable data in each instance of the target type ("AccountRelationshipAccountToInfo POJO").

The target type ("AccountRelationshipAccountToInfo POJO") may be represented by a cache object wrapper implemented as an "AccountRelationshipAccountToInfo" POJO, each instance of which encapsulates a given [AccountTo,Type] pair as cacheable data. In this illustrated example, the cache key definition ("CK[A]") is associated with two OVK definitions ("OVK[A[1]]" and "OVK[A[2]]") responsible for tracking invalidations caused by write actions or CUD operations on underlying data (or a data entity "ARJunction") used to derive each instance of the target type ("AccountRelationshipAccountToInfo POJO") as identified by a corresponding cache key generated based on the cache key definition for the target type ("AccountRelationshipAccountToInfo POJO"). The underlying data (or the data entity "ARJunction") is persisted/stored in the database system.

The first OVK definition ("OVK[A[1]]") comprises, or is identified/distinguished with, data fields "[AccountTo, Type]" as member sub-keys, whereas the second OVK definition ("OVK[A[2]]") comprises, or is identified/distinguished with, a data field "[AccountTo]" as a member sub-key. The first OVK definition ("OVK[A[1]]") tracks invalidations caused by write actions or CUD operations performed on the data entity "ARJunction" with a given "[AccountTo,Type]", whereas the second OVK definition ("OVK[A[2]]") tracks invalidations caused by write actions or CUD operations on bulk invalidations (invalidations across all cache keys with the same given "[AccountTo]" regardless of any value in "[Type]") on the data entity "ARJunction". A change to the data entity "ARJunction" with a given "[AccountTo,Type]" or a bulk invalidation with a given "[AccountTo]" invalidates cached versions/data of corresponding instances of this target type ("AccountRelationshipAccountToInfo POJO").

In response to an occurrence of a write action or a CUD operation on the data entity ("ARJunction") with a given "[AccountTo,Type]", the cache services (118) or the cache invalidator (124) therein can increment OVK version number(s) (e.g., associated with the given "[AccountTo,Type]", etc.) generated for the data entity ("ARJunction") based on the first OVK key definition ("OVK[A[1]]"). In response to an occurrence of a write action or a CUD operation on the data entity ("ARJunction") with a given "[AccountTo]", the cache services (118) or the cache invalidator (124) therein can increment OVK version number(s) (e.g., associated with the given "[AccountTo]", etc.) generated for the data entity ("ARJunction") based on the second OVK key definition ("OVK[A[2]]").

In some operational scenarios, use cases for tracking invalidations as related to the target type ("AccountRelationshipAccountToInfo POJO") may use invalidation API calls. The invalidation API calls that have been placed in or with write actions/paths can queue the invalidations (as caused by write actions or CUD operations on the data entity ("ARJunction")) in the cache services (118) or in the global cache therein.

To include or set up a specific target type for state change based invalidation in cache services (e.g., 118, etc.) as described herein, a number of on-boarding (or preparatory) steps may be taken. It should be noted that the setup operations as described herein are described by way of example but not limitation. Some or all of the setup operations may be applicable to other types of cache services other than state change based invalidation In a non-limiting implementation example, a cache data object wrapper—implemented in the shared cache service layer (102) in a mezzanine tier in between the UI tier (120) and the core tier (122)—may be created in the cache services (118) for the target type. The cache object wrapper is used to represent the target type in the cache services (118). Each instance of the cache object wrapper can be used to encapsulates cacheable data (cached in the L1 and/or L2 caches) of a data object of the target type. The cache object wrapper along with (e.g., all, etc.) its children data fields (e.g., in the entire object graph identifying its children data fields, etc.) can be configured for the target type or for data objects of the target type as serializable.

A cache key builder may be specifically set up or implemented for the target type, as in the case of synchronous or asynchronous cache refreshing or loading as previously discussed. The cache services (118) can use or invoke the cache key builder to compute or generate a cache key for a data object of the target type as necessary.

A cache value provider may be specifically set up or implemented for the target type, as in the case of synchronous or asynchronous cache refreshing or loading as previously discussed. The cache value provider can be used to encapsulate underlying operational logic of building a (cacheable) value of a data object of the target type from underlying data (or data entities) retrieved from a primary data source such as a database.

In some operational scenarios, an organization to which cache service consumers belong may provide a specific implementation of the cache value provider and the cache key builder. The specific implementation of the cache value provider and the cache key builder as provided for or by the organization may make use of methods, APIs, interfaces, classes, class objects, etc., that have already been provided as infrastructure in the cache services (118).

A cache service consumer does not need to explicitly invoke the cache key builder and the cache value provider with read or write requests. For example, the cache key builder and the cache value provider specifically implemented for or by the organization may be automatically invoked internally within the cache services (118) in response to receiving a write request for modifying underlying data used to derive a data object whose value is cached by the cache services (118).

A data object deserializing whitelist may be used to provide additional security, as in the case of synchronous or asynchronous cache refreshing or loading as previously discussed. The target type may be added to the whitelist to allow object serialization/deserialization operations to be performed on a data object of the target type.

As illustrated in FIG. 3A through FIG. 3D, a specific OVK definition (among one or more OVK definitions) can be structured, defined and/or specified for a target type to track a specific type of write action (among one or more types of write actions) performed on underlying data (or data entities) giving rise to a cached value/version of a data object of the target type.

An OVK key—used to index, identify and/or look up an OVK version number generated for underlying data (or data entity)—can be constructed or built by an OVK builder. The OVK builder may be obtained or provided in the cache services (118) in several ways. In an example, the OVK builder may be obtained by directly invoking a cache service method or API call exposed/implemented through a cache service wrapper object of the cache services (118). In another example, the OVK builder may be obtained by first obtaining an instance (which may be a static instance, a single instance, etc.) of the cache service wrapper object from a cache service provider factory object and then invoking the cache service method or API call exposed/implemented through the cache service wrapper object.

As previously noted, OVK-based data change tracking mechanisms such as via transaction observer(s), via cache invalidation APIs (e.g., implemented in the core cache service layer (104), etc.), etc., may be employed to track invalidations caused by write actions or CUD operations on underlying data (or data entities) giving rise to cached versions/values of data objects (e.g., in the core tier (122), etc.) of a target type.

Data change tracking using OVK version numbers as described herein may be implemented and/or performed by a cache invalidator (e.g., 124 of FIG. 1C, etc.). The cache invalidator (124) may carry out data change tracking through a transaction observer, through invalidation API calls invoked from a processing thread (e.g., an application thread, a platform thread, etc.) on a write path, and so forth.

In operational scenarios—such as those with relatively complex relationships between a cached data object and its write actions/operations, relatively high inefficiencies to place explicit invalidation logic based on OVK in write paths with write actions/operations, etc.—in which a transaction observer has been designated to track data changes (or invalidations) caused by one or more types of write actions (or CUD operations) to underlying data (persisted/stored in the database system) giving rise to cached data objects of a target type, the transaction observer may be notified of (e.g., database, primary data source, etc.) write actions/operations on the underlying data (or data entities) that give rise to the cached data objects. In response to receiving such notifications, the transaction observer increments respective OVK version numbers generated for the underlying data (or data entities) based on respective OVK definitions applicable to types of write actions/operations.

In operational scenarios—such as those with relatively simple relationships between a cached data object and its write actions/operations, relatively high efficiencies to place explicit invalidation logic based on OVK in write paths with write actions/operations, etc.—in which invalidation API calls invoked from a processing thread on write paths have been designated to perform data change tracking for cached data objects of a target type, the processing thread on a write path may perform write operations of the write path on underlying data (or data entities persisted/stored in the database system) that gives rise to the cached data objects as well as invoke the invalidation API calls to track one or more types of write actions (or data changes) to the underlying data (data entities) giving rise to the cached data objects.

To set up for a transaction observer to perform OVK based data change tracking operations upon (notifications of) write actions, one or more entity type names for one or more data entities on which write actions are to trigger the OVK based data change tracking operations can be added in one or more name-to-data-entity mappings (denoted as "VersionedEntityType"). The name-to-data-entity mappings ("VersionedEntityType") can be used to map one or more data dictionary names for the one or more data entities to the one or more data entities in the cache services (118). The mappings can be used by the cache services (118) to identify or determine (e.g., all, etc.) data entities on which write actions are to be tracked by OVK version numbers generated based on OVK definitions applicable to the write actions.

For example, in the case of a target type "ManagedContentTypeVersion POJO", OVK definition ("OVK[A[1]]" and "OVK[A[2]]") can be used to track data changes to underlying data entities ("ManagedContentType" and "ManagedContentTypeVersion") from which underlying data is used to derive cached versions/values of (cached) data objects of the target type ("ManagedContentTypeVersion POJO") by incrementing OVK version numbers generated for the data entities ("ManagedContentType" and "ManagedContentTypeVersion").

A cached data object (or a cached version/value of a data object) of the target type ("ManagedContentTypeVersion POJO") is generated based on underlying data from a composite of a (database or table) join between the data entities ("ManagedContentType" and "ManagedContentTypeVersion").

As the data entity type "ManagedContentTypeVersion" represents a child of the data entity type "ManagedContentType" in a parent-child relationship, a data change corresponding to the first OVK definition (OVK[A[1]]) causes OVK version numbers for both of the data entities ("ManagedContentType" and "ManagedContentTypeVersion") to be incremented. In contrast, a data change corresponding to the second OVK definition (OVK[A[2]]) causes only OVK version number(s) for the data entity ("ManagedContentTypeVersion") to be incremented. Since a cached value/version of a data object of the target type ("ManagedContentTypeVersion POJO") is obtained through joining the first data entity ("ManagedContentType") with the second data entity ("ManagedContentTypeVersion"), this means any write action or CUD operation on the first data entity ("ManagedContentType") and/or the second data entity ("ManagedContentTypeVersion")—or any corresponding increments or changes in values of their respective OVK version numbers—invalidates a cached data object (e.g., associated with a unique value combination of data fields "Version Id" and "Type Id," etc.) of the target type ("ManagedContentTypeVersion POJO").

One or more OVK key creators (or builders) can be specifically set up or implemented for generating OVK keys to identify or index OVK version numbers generated for data entities giving rise to cached data objects of a given target type. In many operational scenarios, there exists a one-to-one mapping between data entity types (defined and mapped in the name-to-entity mappings "VersionedEntityType" or "VersionedEntityTypeMapper") associated with the target type and OVK key creators associated with the target type.

The OVK key creators can be added to the name-to-data-entity mappings to support lookup operations for looking up the OVK key creators based on corresponding data entity types or corresponding data entity type names. Example lookup operations may include, but are not necessarily limited to only, using a specific type (or type name) of data entity to look up, in the one or more name-to-data-entity mappings, specific OVK key creator(s) corresponding to the specific type of data entity among all OVK key creators; using a specific type of write operations on a type of data entity to look up, in the one or more name-to-data-entity mappings, specific OVK key creator(s) corresponding to the specific type of write operations on a specific type of data entity among all the OVK key creators, etc.

After an OVK key creator (or builder) is specifically set up or implemented to identify or index an OVK version number generated for a corresponding OVK definition, the cache services (118) can use or invoke the OVK key creator (or builder) to compute an OVK key for the OVK version number as necessary (e.g., in a write operation/action, in a transaction observer, etc.).

In some operational scenarios, within a write action (or CUD operation), invalidation is made against an OVK version number associated with old value(s) before the write action as well as an OVK version number associated with new value(s) after the write action. The cache services (118) may be implemented with a program object (or code segment) that increments both the new and old OVK version numbers in response to the write action performed on underlying data (or data entities).

For example, a cached data object (or instance) of a target type may be used to cache a management content type identifier (denoted as "ManagedContentType.Id") derived from underlying data in a data entity (denoted as "ManagedContentType"). More specifically, the management content type identifier encapsulated in the cached data object may be associated with or derived from (a value in) a data field "ManagedContentType.DeveloperName" in the data entity ("ManagedContentType"). Anytime there is a change in the developer name value in the data field, the cache services (118) needs to invalidate a cached data object associated with the old developer name value in the data field "ManagedContentType.DeveloperName" in addition to invalidating a cached data object associated with the new (changed) developer name value data field "ManagedContentType.DeveloperName".

The target type may be defined with a corresponding OVK definition with data fields or member sub-keys "[OrgID, DeveloperName]" for the purpose of tracking data changes (e.g., in the data field "DeveloperName" for an organization to which cache service consumers belong, etc.) in the data entity (or entity type) "ManagedContentType".

An OVK key creator (or builder) can be specifically set up or implemented for generating OVK keys to identify or index OVK version numbers generated for the data entity "ManagedContentType" giving rise to cached data objects of the target type (each instance of which is used to encapsulate cacheable data "ManagedContentType.Id"). Thus, there exists a one-to-one mapping between the data entity type ("ManagedContentType" as defined and mapped in the name-to-entity mappings) and the OVK key creator.

The OVK key creator can be added to the name-to-data-entity mappings to support lookup operations for looking up the OVK key creator based on the data entity type or corresponding data entity type name.

In the present example, within a write action (or CUD operation) on the data field "DeveloperName" in the data entity "ManagedContentType", invalidation is made against OVK version numbers associated with an old "DeveloperName" data field value before the write action as well as associated with a new "DeveloperName" data field value after the write action. The cache services (118) may be implemented with a program object (or code segment) that increments OVK version numbers for both the old and new OVK version numbers in response to the write action performed on underlying data such as the data field "DeveloperName" in the data entity "ManagedContentType".

The program object (or code segment) implemented in the cache services (118) or the cache invalidator (124) therein may comprise code for detecting a value change in the data field "DeveloperName" and fetching the old "DeveloperName" data field value for the purpose of generating an OVK key for an OVK version number associated with the old "DeveloperName" data field value in addition to generating an OVK key for an OVK version number associated with the new "DeveloperName" data field value. Both OVK keys may be used to look up the OVK version numbers to be incremented in response to the write action.

Invalidation API calls for OVK based data change tracking may be embedded explicitly in (e.g., all, etc.) write paths of transaction(s) to explicitly enqueue or invoke invalidations caused by write actions or CUD operations in the write paths. The invalidation API calls for OVK based data change tracking can take in a list of OVK keys (associated with write action(s) of a write path) as an argument. OVK version numbers may be looked up based on the list of OVK keys and incremented in response to the write action(s).

A "getValue( )" or "getValueWithNoLoad( )" method or API call or the like can be implemented as a part of publicly consumable APIs via a cache service access point class or class object (e.g., "ScaleCacheUtilWrapper", etc.) exposed by the cache services (118) to cache service consumers.

A cache service consumer (e.g., an application thread, etc.) can invoke the "getValue( )", "getValueWithNoLoad( )" or "getValueWithAsyncRefresh( )" method or API call to consume cache services (e.g., read requests, etc.) of a data object. These methods may be exposed through a cache service wrapper object that may be (e.g., directly, indirectly by way of a provider factory object, etc.) referenced in the cache services (118).

Any of these "get" methods or API calls may return a cached version of the data object a) if the cached version is within an TTL time period, or b) if the cached version is beyond the TTL time period but still within an extended TTL time period AND if the data object is designated to be invalidated based on object state/data changes as tracked based on OVK definitions AND if the cached version is not invalidated as determined from OVK version numbers of underlying data (or data entities).

The "getValue( )" method or API method can be used to synchronously refresh a cached data object if a cached version/value of the data object is determined to be invalidated. An OVK key (or metadata parameter values used to construct such OVK key) may be provided as a part of input parameters to the "getValue( )" method or API call and used to determine whether the cached version/value of the data object is still valid in cache (e.g., in the CaaS (L2) cache (106), etc.).

The "getValueWithNoLoad( )" method or API method can be used to perform read-only operations with regards to one or more cached data objects without causing any of the one or more cached data objects to be refreshed even if a cached version/value of any of the one or more data objects is determined to be invalidated. A list of one or more OVK keys (or metadata parameter values used to construct such OVK keys) may be provided as a part of input parameters to the "getValueWithNoLoad( )" method or API call and used to determine whether a cached version/value of any of the one or more data objects is still valid in cache (e.g., in the CaaS (L2) cache (106), etc.).

The "getValueWithAsyncRefresh( )" method or API method can be used to asynchronously refresh a cached data object if a cached version/value of the data object is determined to be invalidated. An OVK key (or metadata parameter values used to construct such OVK key) may be provided as a part of input parameters to the "getValueWithAsyncRefresh( )" method or API call and used to determine whether the cached version/value of the data object is still valid in cache (e.g., in the CaaS (L2) cache (106), etc.).

2.6. Counter Tracker Services

Counter tracker services may be provided for one or more (cached) counters in a global cache as a part of cache services. The counter tracker services may be implemented using a set of counter tracker service APIs exposed via a counter tracker class object (denoted as "FancyCacheClient"). The set of counter tracker service APIs may include a first counter tracker service API (denoted as "getCounterValue( )"), which takes an identifier of a counter as input and retrieves an up-to-date cached value of the counter; a second counter tracker service API (denoted as "incrementCounter( )"), which takes an identifier of a counter as input and increments a current value of the counter; a third counter tracker service API (denoted as "incrementCounterIfExists( )"), which takes an identifier of a counter as input and increments a current value of the counter if the counter already exists in the global cache; a fourth counter tracker service API (denoted as "decrementCounterIfExists( )"), which takes an identifier of a counter as input and decrements a current value of the counter if the counter already exists in the global cache; and so forth.

Initializing a counter can be an expensive operation. Hence it may be a bad design choice for the counter to be initialized (e.g., as a default, etc.) on a write path. This is an important consideration if counter tracker service methods/APIs used to trigger incrementing or decrementing the counter are invoked directly by a foreground application thread or indirectly by a transaction observer in latency sensitive transactions, as resultant latencies from initializing the counter may impact a broad set of users, teams and/or functional areas of a hosted organization in a multitenant computing system.

A counter may be used in conjunction with a data entity. In some operational scenarios, counter tracker service consumer use cases constitute only a (e.g., a relatively small, a relatively infrequent, etc.) subset of overall use cases involving the data entity. The counter tracker service consumer use cases involving the data entity may be able to tolerate latency in counter initialization as compared with other use cases involving the data entity. Exposing counter initialization latencies to the other use cases in the write path upon data manipulation operations (e.g., insert, delete, etc.) on the data entity is unnecessary if not at all unacceptable. A design choice that initializes the counter in the read path instead of the write path is generally consistent with an approach of not introducing high latency calls in transaction-observer-based methods or APIs.

In some operational scenarios in which a counter corresponding to a specified counter key passed in invoked counter increment/decrement calls (e.g., incrementCounterIfExists( ), decrementCounterIfExists( ), etc.) does not exist (or is not found) in the global cache (or the CaaS (L2) cache (106)), counter increment/decrement operations in response to the invoked counter increment/decrement calls may be implemented as no-ops (or no operations).

This does not present any issues for use cases in which the counter and/or its count/value is backed up by or stored in a persistent data repository such as the primary data source (108). In those use cases, there may not be any loss of data, since an up-to-date count (or value) of the counter can be reconstructed on a read path via the primary data source, upon invoking the method or API call getCounterValue( ), so long as the primary data source has stored the up-to-date count (or value) of the counter.

On the other hand, depending on counter usage patterns, this may possibly present loss-of-count issues in use cases in which the count/value of the counter is not backed up by (or not stored in) a persistent data such as the primary data source (108) but is (e.g., only, etc.) temporarily stored/cached as a transient in-memory counter in the global cache.

More specifically, a low read and high write usage pattern or scenario may be susceptible to losing counts in the counter. A counter data object identifier used to identify, index and/or temporarily store the counter in the global cache may get explicitly evicted or TTL expired. An absence of any subsequent read (cycle) after the counter is evicted or TTL expired and/or any absence of a preceding read (cycle) within a TTL period may result in incomplete or lossy tracking of counter increment/decrement operations all the way up to the next read (cycle), as these counter increment/decrement operations can be no-ops when the counter does not exist in the cache. This incomplete or lossy tracking of counter increment/decrement operations can repetitively occur after the next eviction or after the next expiration of the counter.

One option or solution available for resolving these issues in this usage/consumption pattern is to avoid transaction-observer-based or invoked counter increment/decrement operations. A counter increment or decrement call—which is used to trigger a counter increment or decrement operation if the counter exists in the global cache—can be explicitly placed and paired with a counter read call "getCounterValue( )". The counter read call "getCounterValue( )"—used to trigger a counter initialization if the counter does not exist in the global cache and/or to renew TTL period if the counter does exist—can be executed first to initialize the counter in the global cache, and followed by the counter increment or decrement call in write paths, provided that the write paths of the data entity in this usage/consumption pattern can absorb or tolerate any latency incurred in initiating the counter by the paired counter read call "getCounterValue( )".

A high read and low write usage pattern or scenario may be least susceptible to loss counts/values in the counter, since the counter may be timely initialized or TTL renewed upon each read (cycle).

A low read and low write usage pattern or scenario may fall somewhere in between (e.g., minimum and maximum, etc.) bounds set by the foregoing low-read-high-write and high-read-low-write usage patterns or scenarios, and may be examined on a case-by-case basis for determining a suitable solution (e.g., pairing with read calls on write paths, not pairing with read calls on write paths, etc.). Factors such as risks of incomplete or lossy count tracking in write paths may be balanced against a tolerance level for latency in the write paths.

To include or set up counter tracker services for a specific counter in cache services (e.g., 118, etc.) as described herein, a number of on-boarding (or preparatory) steps may be taken. It should be noted that the setup operations as described herein are described by way of example but not limitation. Some or all of the setup operations may be applicable to other types of cache services other than counter tracker services.

In a non-limiting implementation example, a counter wrapper object—implemented in the shared cache service layer (102) in a mezzanine tier between the UI tier (120) and the core tier (122) and designated with a corresponding target type—may be created in the cache services (118). The counter wrapper object may be a largely empty or light weight class or an instance thereof and may be used as a cache service access point to launch or invoke code segments, methods, API calls implemented with other classes or class objects. In some operational scenarios, a counter data object has a cached (counter) value of a constant value type such as LONG. The counter wrapper object may not be cached in the global memory; for example, the cached value such as a LONG value of the counter can be identified, indexed and/or cached with a cached data object key in the global memory.

The counter wrapper object can be specifically set up to cause a transaction observer (e.g., implemented in the core cache service layer (104) in the core tier (122), etc.) to perform counter increment/decrement operations in response to (notifications of) write actions. Additionally, optionally or alternatively, counter increment/decrement code segments, methods or API calls can be explicitly placed in some or all write paths to allow the counter increment/decrement code segments, methods or API calls to be invoked to perform counter increment/decrement operations when write actions in the write paths occur.

As used herein, a write path may refer to a sequence of operations in which a write action is performed on a cached data object or a data entity associated with the cached data object to result in an invalidation of the cached data object. A read path may refer to a sequence of operations in which a read action is performed on a cached data object or a data entity associated with the cached data object; the read action typically does not invalidate the cached data object.

To set up for a transaction observer to perform counter increment/decrement operations upon (notifications of) write actions, one or more entity type names for one or more data entities on which write actions are to trigger counter increment/decrement operations can be added in one or more name-to-data-entity mappings (denoted as "VersionedEntityType") between one or more data dictionary names for the one or more data entities and the one or more data entities in the cache services (118). The mappings can be used by the cache services (118) to identify or determine (e.g., all, etc.) data entities on which write actions are to invalidate cached data objects.

One or more counter tracker cache key creators can be specifically set up or implemented (e.g., in a "CounterTrackerKey" class or class object, etc.) for the counter. The counter tracker cache key creators can be applied to generating, based at least in part on an organization identifier for a hosted organization in the multitenant computing system, respective cache keys for the one or more data entity types of the one or more data entities on which write actions are to trigger counter increment/decrement operations. Different cache keys can be created by these key creators for different combinations of data entity types and types of write actions. Example types of write actions in different combination of data entity types and types of write actions may include, but are not necessarily limited to only, data manipulation language (DML) operations such as INSERT, DELETE, etc., on data entities of data entity types in these combinations.

The counter tracker cache key creators can be added to the name-to-data-entity mappings to support lookup operations related to the counter tracker cache key creators. Example lookup operations may include, but are not necessarily limited to only, using a specific type of data entity to look up, in the one or more name-to-data-entity mappings, specific counter tracker cache key creator(s) corresponding to the specific type of data entity among all counter tracker cache key creators for different combinations of types of data entities associated with the counter and types of write actions on the data entities.

After a counter cache key builder is specifically set up or implemented for the counter, the cache services (118) (or the counter tracker services therein) can use or invoke the counter cache key builder to compute a counter cache key for the counter as necessary (e.g., upon an invocation of an "getCounterValue" method or API call, upon an invocation of a counter increment or decrement operation, etc.).

A counter value provider may be specifically set up or implemented for the counter. The counter value provider can be used to supply an initial counter value (e.g., as a LONG value type, an integer greater than zero (0), etc.) whenever a cached value of the counter (as identified or keyed/indexed by an associated counter data object identifier) is absent in the global cache.

A transaction-observer-based approach for performing counter increment/decrement operations on write paths allows counter tracker service consumers to use a common infrastructure that can be relatively easily plugged in without needing to explicitly inject these operations for post-commit execution or to explicitly place related API calls in (e.g., all, etc.) the write paths within code segments of the counter tracker service consumers in which write actions occur. A transaction observer is automatically made available under the transaction-observer-based approach to perform counter increment/decrement operations on write paths. The transaction observer can automatically invoke counter tracker service APIs such as "incrementCounterValueIfExists( )", "decrementCounterValueIfExists", etc., to carry out these operations in the write paths, even if a counter tracker service consumer has not explicitly embedded these APIs on the write paths.

That being said, a counter tracker service consumer can use counter tracker service APIs such as "incrementCounterValueIfExists( )", "decrementCounterValueIfExists", etc.; explicitly embed some or all these APIs in transactions write paths or transactions with write actions; and explicitly perform counter increment/decrement operations post commit of these transactions, instead of using a transaction observer to (e.g., implicitly, automatically, etc.) perform these operations. The APIs can take a counter cache key builder, etc., as arguments. In this approach, the counter cache service consumer can implement counter tracker cache key creators using the same approach as (or using a similar approach to) what outlined in the transaction-observer-based approach.

FIG. 1D illustrates example components of counter tracker services (e.g., 118-1, etc.) for carrying out counter tracker service process flows including but not limited to example process flows as illustrated in FIG. 2C. Example computing systems that implement any, some and/or all of the components may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks.

Additionally, optionally or alternatively, the process flows of FIG. 2C may be implemented and/or performed using one or more computer programs, other software elements, and/or digital logic in any of a general-purpose computer or a special-purpose computer, while performing data retrieval, transformation, and storage operations that involve interacting with and transforming the physical state of memory of the computer. The process flows of FIG. 2A and FIG. 2B illustrate but some example process flows for carrying out cache services. Other process flows may involve additional or fewer steps, in potentially varying arrangements.

In step 232 (denoted as "getCounterValue( )", which may be implemented as a counter tracker service method or API call in a counter service class or class object to be invoked by application threads attempting to access a cached value of a counter in cache), one or more counter tracker (service) consumers 132-1 may attempt to access a cached value of a counter identified by a counter identifier k1 through counter tracker services (118-1), which may be a part of the cache services (118). Here k1 denotes a cache key identifying the counter. Each of the counter tracker service consumers (132-1) may represent an application thread running in a cache service requesting tier such as a UI tier (e.g., 120 of FIG. 1B, etc.) or a non-UI tier.

Example counters may include, but are not necessarily limited to only, any of: a cache-only counter, a persisted/stored counter of a primary data source, and so forth.

The cached value of the counter may be an up-to-date value of the counter as presently stored in the global cache. In some operational scenarios, the up-to-date value of the counter is persisted in and/or retrieved from the primary data source (108). In some operational scenarios, the up-to-date value of the counter is a cache-only value of the counter whose value is not persisted/stored in a (e.g., any, etc.) primary data source.

By way of illustration but not limitation, multiple counter tracker service consumers (e.g., 132-1, etc.)—e.g., N concurrent application threads, where N is a positive integer greater than one (1)—attempt to fetch the cached value of the counter in parallel through the counter tracker services (118-1). Each of the counter tracker service consumers (132-1) can send or invoke a respective read request (or get request) for the counter. Read requests of the counter may be directed to and received by the counter tracker services (118-1) or a counter reader 128-3 (which may be a part of a cache fetcher 128) therein. Each of the read requests may comprise the counter identifier (k1) for the counter.

In response to (e.g., directly, indirectly, etc.) receiving the read requests for the counter from the counter tracker service consumers (132-1), in step 234 (denoted as "getCounterValue( )", which may be a counter reader method or API call in a counter reader class or class object invoked by getCounterValue( ) in the counter tracker service class or class object in step 232), the counter reader (128-3) determines the counter identifier (k1) for the counter and uses the counter identifier (k1) to attempt to fetch a cached value of the counter from the global cache or the CaaS (L2) cache (106).

In response to successfully fetching the cached value of the counter from the CaaS (L2) cache (106) (or a L2 cache hit), in steps 238 and 246 (which may successively return results from the methods or API calls getCounterValue( ) in steps 234 and 232), the cache fetcher (128) (e.g., directly, indirectly, etc.) returns the cached value of the counter as fetched from the CaaS (L2 cache (106) to the counter tracker service consumers (132-1).

On the other hand, in response to unsuccessfully fetching a cached value of the counter from the CaaS (L2) cache (106) (or a L2 cache miss), in step 240 (denoted as "initCounterValue( )", which may be a counter reader method or API call in the counter reader class or class object invoked by "getCounterValue( )" in the same counter reader class or class object in step 234), the counter reader (128-3) proceed to invoke a counter loader 134-1 to initialize a cached value of the counter in the CaaS (L2) cache (106). This occurs in operational scenarios in which a null or invalid counter value (e.g., zero (0), etc.) may be returned in step 238 to indicate a L2 cache miss. Such cache miss can happen if the cached version of the data object has not been initialized in, or has expired from (e.g., beyond a TTL period, beyond an extended TTL period, etc.), the CaaS (L2) cache (106).

In some operational scenarios, an up-to-date value of a counter may not be persisted in a primary data source (e.g., 108, etc.) but rather is a cache-only value that can only possibly exist in the global cache (e.g., within a TTL period starting from a given time point at which the cached-only value was initialized or read). In these operational scenarios, initializing a cached value of a counter in cache means temporarily storing an initial value (e.g., as provided by way of a counter value provider class or class object, etc.) of the counter in a global cache such as the CaaS (L2) (106), which is shared across all application threads (e.g., counter tracker service consumers, etc.) or virtual machines in which the application threads are running. In some embodiments, each read access to the (e.g., cache-only, in-memory-only, etc.) cached value of the counter in the global cache causes the TTL period for the counter to be restarted or renewed.

In some operational scenarios, an up-to-date value of a counter may be persisted in a primary data source (e.g., 108, etc.). In these operational scenarios, initializing a cached value of a counter in cache means retrieving the up-to-date value (e.g., of a LONG value type, casted into a LONG value type, etc.) of the counter from the primary data source (108) and temporarily storing the up-to-date value of the counter in the global cache such as the CaaS (L2) (106).

By way of illustration but not limitation, the cached value of the counter may be built in the global cache synchronously by applying a set of synchronous actions (or SYNC operations) implemented for the counter.

Upon being invoked, in step 242, the counter loader (134-1) initializes the cached value of the counter in the CaaS (L2) cache (106) with a counter loader method or API "incrementCounter( )" implemented in (or invokable by) the counter loader class or class object. This counter loader method or API "incrementCounter( )" may create a new cached value if no valid cached value is found to exist in the global cache, and/or may increment a cached value if such cached value is found to exist in the global cache.

The counter loader (134-1) can use a (counter) value provider associated with the counter to carry out some or all these SYNC operations to initialize a cached value of the counter in the global cache synchronously by making API calls including but not limited to object query language API calls, database connect API calls for executing callable statements, database statements, query statements, etc. The value provider associated with the counter may be implemented as an instance of a class, an object, a specific implementation of a class interface, a specific implementation of an abstract class, etc.

Multiple (e.g., N, etc.) application threads may concurrently attempt to read a cached value of the counter in need of initialization and trigger initializing the counter in cache. The counter loader (134-1) may use a distributed lock strategy (e.g., a lock arbitration algorithm, a first-in-first-out lock arbitration algorithm, a priority-based arbitration algorithm, etc.) to coordinate among the application threads and to ensure that only a single application thread (e.g., a single Java thread, etc.) is selected—from among all the N application threads that are concurrently making read requests for the counter—to initializing the counter in the global cache.

Under the distributed lock strategy, a distributed (soft) lock key may be placed in the CaaS (106) in a system instance or a point of deployment (POD) for the counter and granted at a given time to only a single application thread among all the application threads in the system instance (or the POD) that are attempting to fetch the counter (or a cached value thereof) in need of initialization and triggering initializing the counter in cache.

The application thread that has been granted with the distributed lock key for the counter is allowed to initialize the counter in cache. All others application threads that have not been granted the distributed lock key for the counter are not allowed to initialize the counter and have to wait (e.g., spin-wait, etc.) for an up-to-date cached value of the counter at least until the application thread that has been granted with the lock finishes initializing the counter in cache.

3.0 Example Embodiments

FIG. 4 illustrates an example process flow that may be implemented by a computing system (or device) as described herein. In block 402, cache services (e.g., 118 of FIG. 1A, etc.) receive, from a first processing thread, a read request for a data object.

In block 404, in response to the read request, the cache services (118) determine whether a cached version of the data object is available from a global cache.

In block 406, in response to determining that the cached version of the data object is not available from the global cache, the cache services (118) immediately return a result to the first processing thread to indicate that the data object is not available from the global cache. The first processing thread is freed from waiting for the data object to become available from the global cache.

In block 408, the cache services (118) enqueue, for the data object, a cache refresh message in a message queue to cause a second different processing thread to subsequently dequeue the cache refresh message for the data object and build the data object in the global cache using underlying data persisted in and retrieved from a primary data source among the one or more primary data sources.

In an embodiment, the cache services are further configured to perform: dequeuing, by the second processing thread from the message queue, the cache refresh message; building an up-to-date version of the data object using the underlying data retrieved from the primary data source; updating the global cache to include the up-to-date version of the data object to be returned to cache service consumers in response to receiving read requests for the data object from the cache service consumers; etc.

In an embodiment, the first processing thread, without waiting for the data object to become available from the global cache, is unblocked from performing one or more operations while the new cached version of the data object is being built by the second processing thread.

In an embodiment, the first processing thread is among a plurality of processing threads that are making a plurality of concurrent read requests for the data object.

In an embodiment, the second processing thread is a background process designated for dequeuing cache refresh messages and building up-to-date cached versions of data objects in response to the cache refresh messages.

In an embodiment, the first processing thread performs user interface component rendering operations that make use of data objects retrieved from the global cache.

In an embodiment, the up-to-date version of the data object is served to an application server; the application server maintains a local cache; the application server updates the local cache to include the up-to-date version of the data object in response to determining that the data object is permitted for caching in local caches.

Figure 4A:
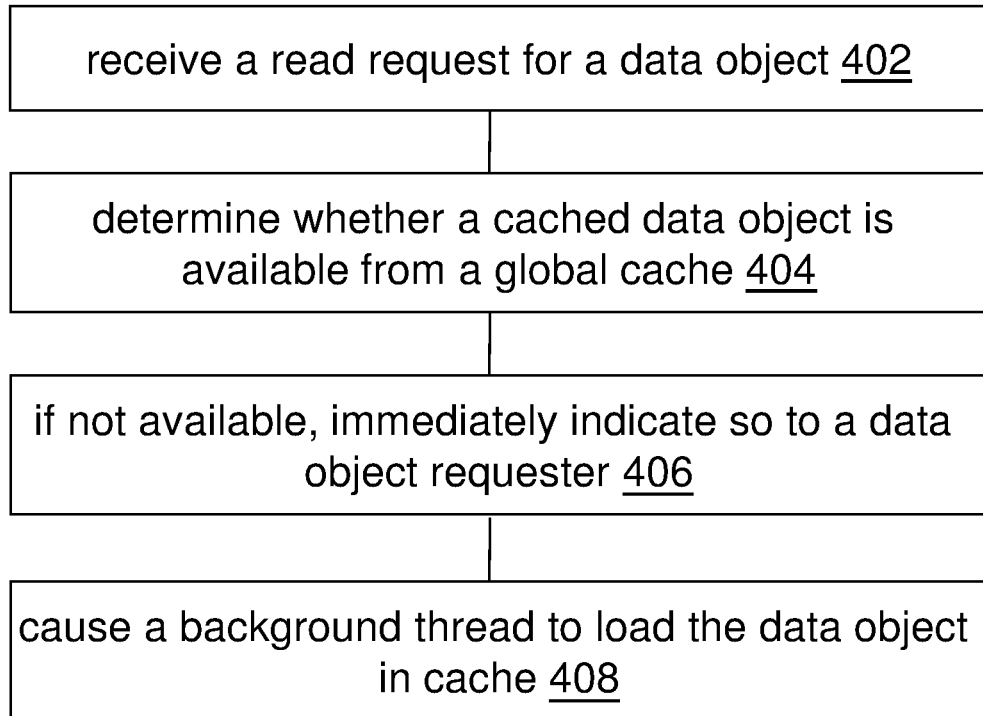
FIG. 4A through FIG. 4D illustrate example process flows for cache services.
Figure 4B:
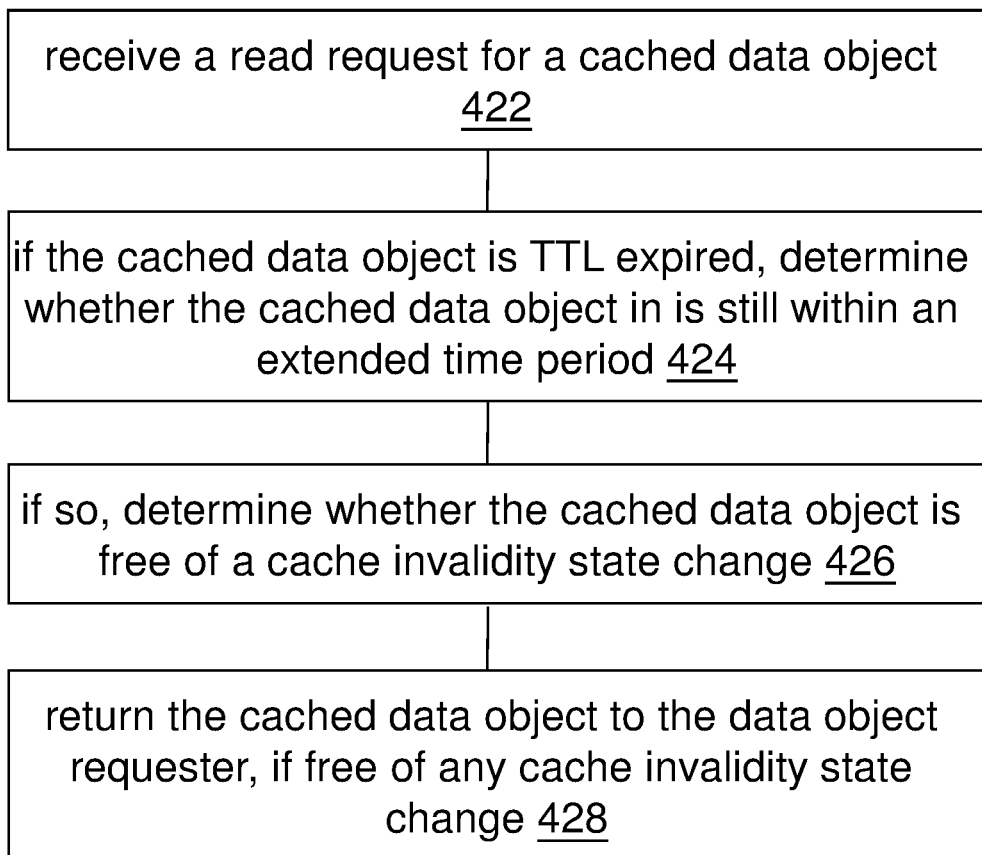

FIG. 4B illustrates an example process flow that may be implemented by a computing system (or device) as described herein. In block 422, cache services (e.g., 118 of FIG. 1A, etc.) receive, from a data object requester, a request for retrieving a cached data object from a data object cache used to cached data objects retrieved from one or more primary data sources.

In block 424, in response to determining that the cached data object in the data object cache is expired, the cache services (118) determine whether the cached data object in the data object cache is still within an extended time period.

In block 426, in response to determining that the cached data object in the data object cache is still within an extended time period, the cache services (118) determine whether the cached data object is free of a cache invalidity state change caused by a data change operation.

In block 428, in response to determining that the cached data object is free of a cache invalidity state change, the cache services (118) return the cached data object to the data object requester.

In an embodiment, the extended time period is configured specifically for the cached data object.

In an embodiment, the cached data object is identified in a data object deserializing whitelist to be a deserializable data object.

In an embodiment, the data object cache represents a global cache; the cached data object is cached by one or more application servers in one or more local caches in addition to the global cache in response to determining that the cached data object is specified by a L1 cacheable data object whitelist as cacheable in local caches.

In an embodiment, the cache services (118) is further configured to perform: in response to determining that the cached data object in the data object cache is not within the extended time period, avoid returning the cached data object to the data object requester.

In an embodiment, the cache services (118) is further configured to perform: in response to determining that the cached data object is not free of a cache invalidity state change, avoid returning the cached data object to the data object requester.

In an embodiment, the cache services (118) is further configured to perform: in response to determining that the cached data object is not free of a cache invalidity state change, causing the cached data object to be rebuilt in the data object cache using underlying data persisted in and retrieved from the one or more primary data sources.

Figure 4C:
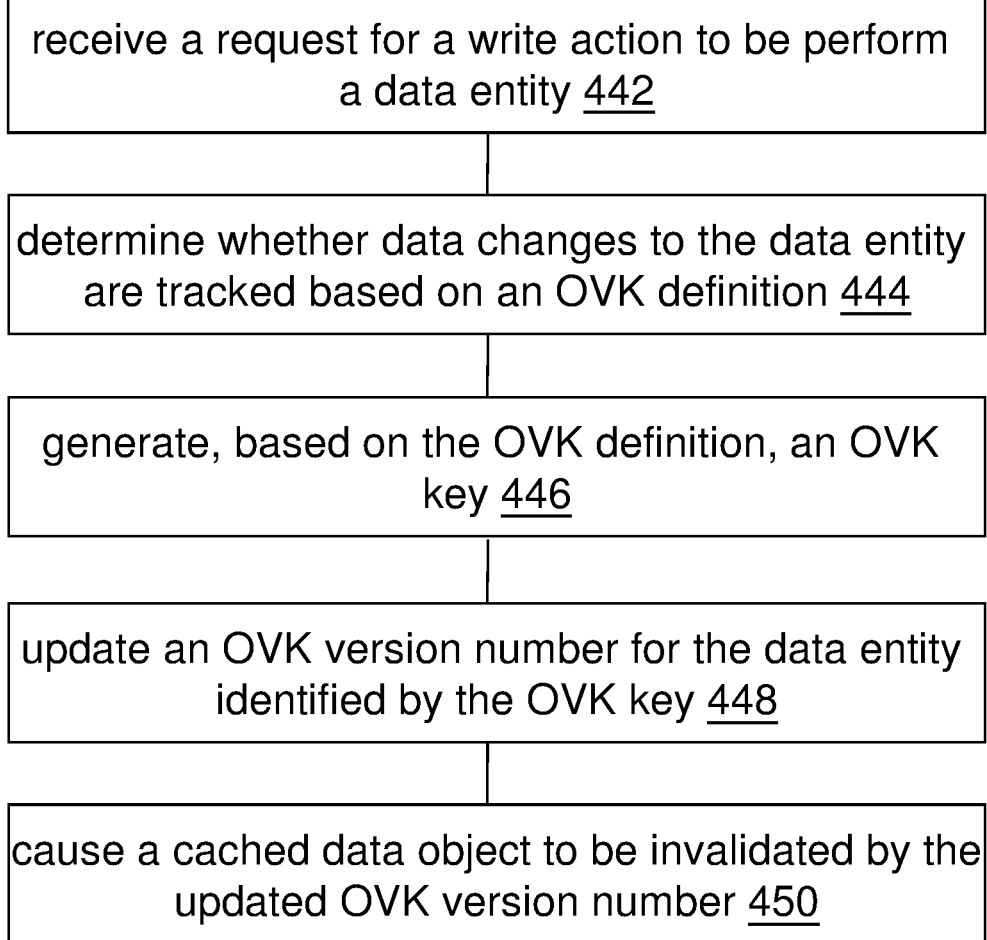

FIG. 4C illustrates an example process flow that may be implemented by a computing system (or device) as described herein. In block 442, cache services (e.g., 118 of FIG. 1A, etc.) receive a request for a write action to be perform a data entity persisted in one or more primary data sources.

In block 444, the cache services (118) determine whether data changes to the data entity are tracked based on an OVK definition of a target data object type.

In block 446, in response to determining that the data changes to the data entity are tracked based on the OVK definition of the target data object type, the cache services (118) generate, based on the OVK definition of the target data object type, an OVK key from data field values specified in the request for the write action.

In block 448, the cache services (118) update an OVK version number for the data entity, the OVK version number being identified by the OVK key.

In block 450, the cache services (118) cause a cached data object of the target data object type to be invalidated by the updated OVK version number, the cached data object of the target data object type being derived based at least in part on underlying data in the data entity persisted in the one or more primary data sources.

In an embodiment, the OVK version number is updated by a transaction observer that monitors progresses of transactions with write actions performed on the data entity.

In an embodiment, the OVK version number is updated by an invalidation API call directly embedded in a processing thread that performs the write action.

In an embodiment, the OVK version number is used by a processing thread that processes a read request for the cached data object to determine whether the cached data object is invalidated.

In an embodiment, the cached data object of the target data object type is cached in a global cache; a corresponding cache key definition is specified for the target data object type to generate cache keys for cached data objects of the target data object type; a cache key generated based on the cache key definition is used to identify the cached data object in the global cache.

In an embodiment, data objects of the target data object types are invalidated by one or more types of write actions; one or more OVK definitions are specified for the target data object type to respectively track the one or more types of write actions.

In an embodiment, the updated OVK version number causes a plurality of cached data objects of the target data object type including the cached data object to be invalidated in a global cache; each cached data object in the plurality of cached data objects of the target data object type is derived based at least in part on respective underlying data in the data entity persisted in the one or more primary data sources.

Figure 4D:
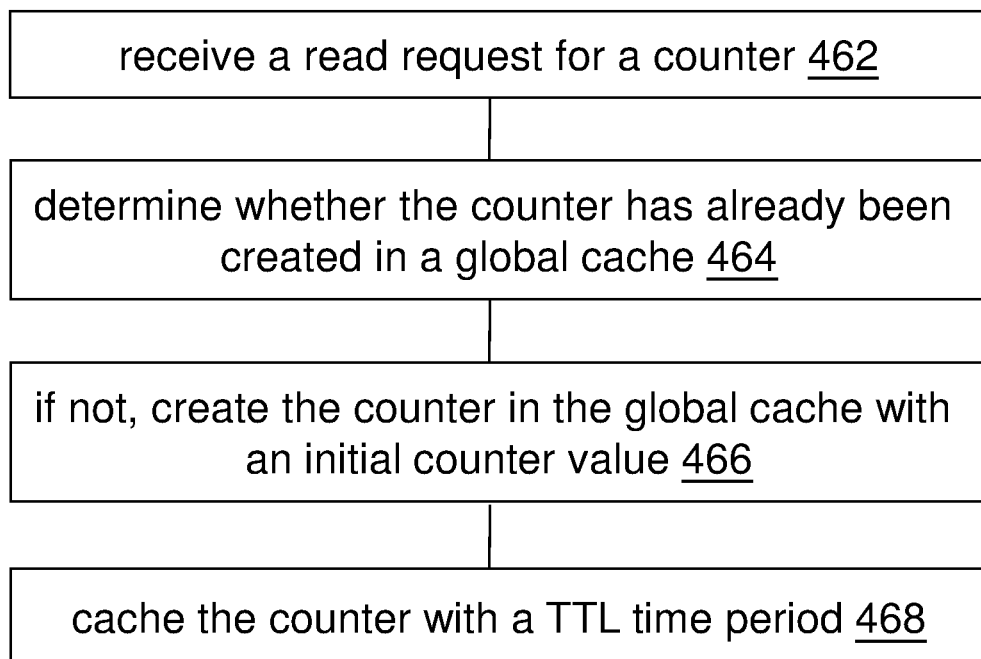

FIG. 4D illustrates an example process flow that may be implemented by a computing system (or device) as described herein. In block 442, cache services (e.g., 118 of FIG. 1A, etc.) receives a read request for a counter designated to be only cached in a global cache. The counter is excluded from being persisted in and retrieved from one or more primary data sources.

In block 444, the cache services (118) determine whether the counter has already been created in the global cache.

In block 446, in response to determining that the counter has already been created in the global cache, the cache services (118) create the counter in the global cache with an initial counter value while continually excluding the counter from being persisted in and retrieved from the one or more primary data sources.

In block 448, the cache services (118) cache the counter with a time-to-live (TTL) time period. The time-to-live time period is to be renewed on each subsequent read request of the counter. The counter is temporally stored in the data object cache until the TTL time period lapses.

In an embodiment, the cache services (118) are further configured to perform: receiving a write request for a second counter designated to be only cached in the global cache, the second counter being excluded from being persisted in and retrieved from the one or more primary data sources; determining whether the second counter is valid in the global cache; in response to determining that the second counter is not valid in the global cache, avoiding creating the second counter in the global cache; etc.

In an embodiment, the cache services (118) are further configured to perform: receiving a write request for the counter; determining whether the counter is valid in the global cache; in response to determining that the counter is valid in the global cache, performing a write action on the counter as requested by the write request.

In an embodiment, the write action increments the counter; incrementing the counter is performed by the write action atomically with an operation of an operation type for which the counter maintains a running value in relation to an up-to-date total number of operations of the operation type that have been performed for a time period.

In an embodiment, the write action does not renew the TTL time period set forth for the counter by a preceding read action performed on the counter.

In an embodiment, the read request for the counter is originated from a processing thread in a plurality of processing threads that originate a plurality of read requests for the counter; other processing threads in the plurality of read requests are blocked until the processing thread creates and caches the counter in the global cache.

In an embodiment, the counter is used to track one of: an up-to-date total number of user logins made by a user or a user group, an up-to-date total number of license users in a population of users, an up-to-date resource usage made by a population of users, a count variable that is expensive to be persisted in the one or more primary data sources, an up-to-date record number of a data entity of an organization hosted in a multitenant computing system, etc.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
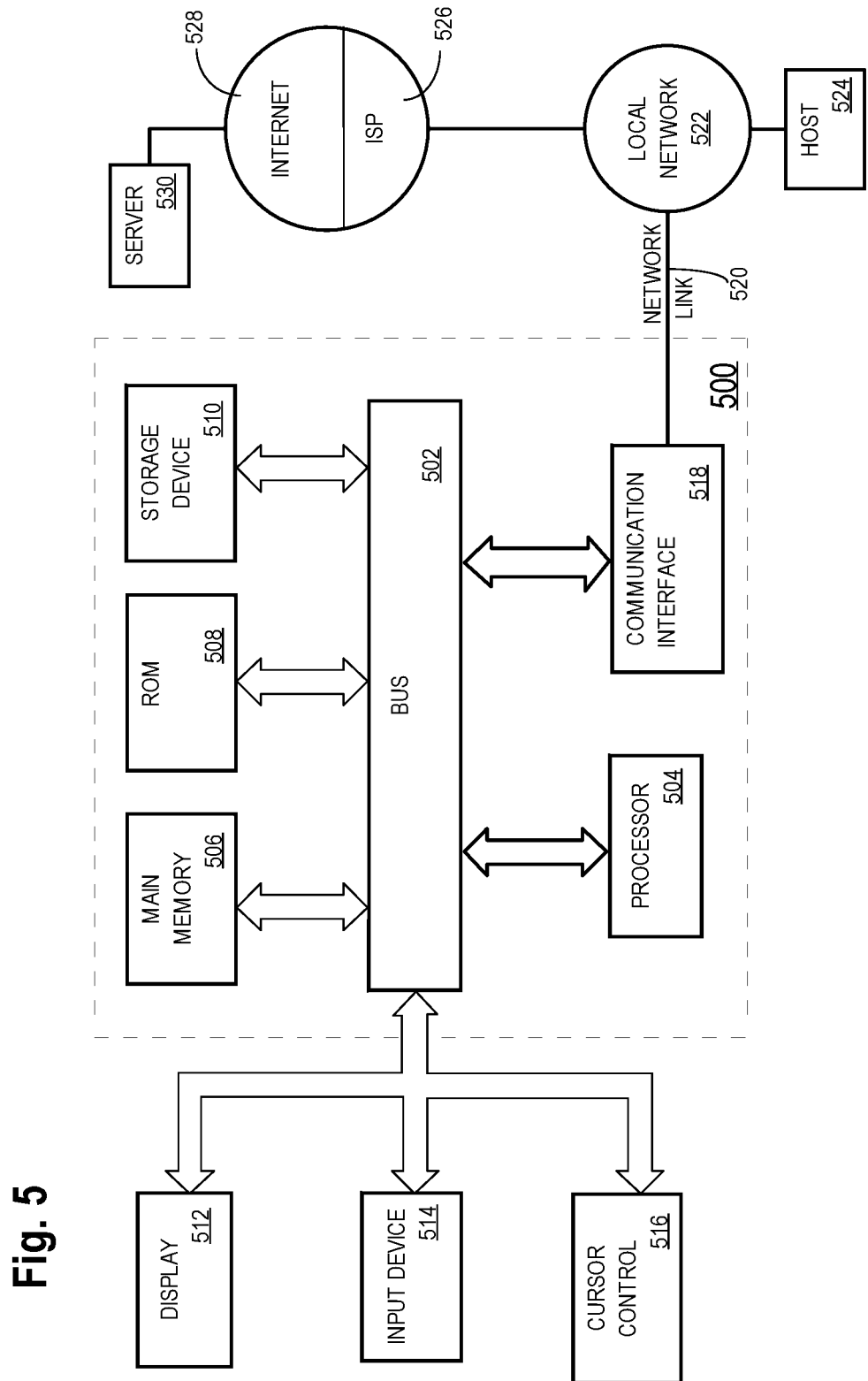
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving, from a data object requester, a request for retrieving a cached data object from a data object cache used to cached data objects retrieved from one or more primary data sources;
in response to determining that the cached data object in the data object cache is expired, performing:
determining whether the cached data object in the data object cache is still within an extended time period;
in response to determining that the cached data object in the data object cache is still within an extended time period, performing:
determining whether the cached data object is free of a cache invalidity state change caused by a data change operation;
in response to determining that the cached data object is free of a cache invalidity state change, returning the cached data object to the data object requester.

2. The method as recited in claim 1, wherein the extended time period is configured specifically for the cached data object.

3. The method as recited in claim 1, wherein the cached data object is identified in a data object deserializing whitelist to be a deserializable data object.

4. The method as recited in claim 1, wherein the data object cache represents a global cache, and wherein the cached data object is cached by one or more application servers in one or more local caches in addition to the global cache in response to determining that the cached data object is specified by a L1 cacheable data object whitelist as cacheable in local caches.

5. The method as recited in claim 1, further comprising: in response to determining that the cached data object in the data object cache is not within the extended time period, avoid returning the cached data object to the data object requester.

6. The method as recited in claim 1, further comprising: in response to determining that the cached data object is not free of a cache invalidity state change, avoid returning the cached data object to the data object requester.

7. The method as recited in claim 1, further comprising: in response to determining that the cached data object is not free of a cache invalidity state change, causing the cached data object to be rebuilt in the data object cache using underlying data persisted in and retrieved from the one or more primary data sources.

8. One or more non-transitory computer readable media storing a program of instructions that is executable by a device to perform:
receiving, from a data object requester, a request for retrieving a cached data object from a data object cache used to cached data objects retrieved from one or more primary data sources;
in response to determining that the cached data object in the data object cache is expired, performing:
determining whether the cached data object in the data object cache is still within an extended time period;
in response to determining that the cached data object in the data object cache is still within an extended time period, performing:
determining whether the cached data object is free of a cache invalidity state change caused by a data change operation;
in response to determining that the cached data object is free of a cache invalidity state change, returning the cached data object to the data object requester.

9. The media as recited in claim 8, wherein the extended time period is configured specifically for the cached data object.

10. The media as recited in claim 8, wherein the cached data object is identified in a data object deserializing whitelist to be a deserializable data object.

11. The media as recited in claim 8, wherein the data object cache represents a global cache, and wherein the cached data object is cached by one or more application servers in one or more local caches in addition to the global cache in response to determining that the cached data object is specified by a L1 cacheable data object whitelist as cacheable in local caches.

12. The media as recited in claim 8, wherein the program of instructions is executable by the device to further perform: in response to determining that the cached data object in the data object cache is not within the extended time period, avoid returning the cached data object to the data object requester.

13. The media as recited in claim 8, wherein the program of instructions is executable by the device to further perform: in response to determining that the cached data object is not free of a cache invalidity state change, avoid returning the cached data object to the data object requester.

14. The media as recited in claim 8, wherein the program of instructions is executable by the device to further perform: in response to determining that the cached data object is not free of a cache invalidity state change, causing the cached data object to be rebuilt in the data object cache using underlying data persisted in and retrieved from the one or more primary data sources.

15. A system, comprising:
one or more computing processors;
one or more non-transitory computer readable media storing a program of instructions that is executable by the one or more computing processors to perform:
receiving, from a data object requester, a request for retrieving a cached data object from a data object cache used to cached data objects retrieved from one or more primary data sources;
in response to determining that the cached data object in the data object cache is expired, performing:
determining whether the cached data object in the data object cache is still within an extended time period;
in response to determining that the cached data object in the data object cache is still within an extended time period, performing:

determining whether the cached data object is free of a cache invalidity state change caused by a data change operation;

in response to determining that the cached data object is free of a cache invalidity state change, returning the cached data object to the data object requester.

16. The system as recited in claim 15, wherein the extended time period is configured specifically for the cached data object.

17. The system as recited in claim 15, wherein the cached data object is identified in a data object deserializing whitelist to be a deserializable data object.

18. The system as recited in claim 15, wherein the data object cache represents a global cache, and wherein the cached data object is cached by one or more application servers in one or more local caches in addition to the global cache in response to determining that the cached data object is specified by a L1 cacheable data object whitelist as cacheable in local caches.

19. The system as recited in claim 15, wherein the program of instructions is executable by the one or more computing processors to further perform: in response to determining that the cached data object in the data object cache is not within the extended time period, avoid returning the cached data object to the data object requester.

20. The system as recited in claim 15, wherein the program of instructions is executable by the one or more computing processors to further perform: in response to determining that the cached data object is not free of a cache invalidity state change, avoid returning the cached data object to the data object requester.

21. The system as recited in claim 15, wherein the program of instructions is executable by the one or more computing processors to further perform: in response to determining that the cached data object is not free of a cache invalidity state change, causing the cached data object to be rebuilt in the data object cache using underlying data persisted in and retrieved from the one or more primary data sources.

* * * * *